(12) United States Patent
Miao

(10) Patent No.: US 9,961,487 B1
(45) Date of Patent: May 1, 2018

(54) METHODS AND APPARATUS FOR ENABLING PROXIMITY SERVICES IN MOBILE NETWORKS

(71) Applicant: Guowang Miao, Conroe, TX (US)

(72) Inventor: Guowang Miao, Conroe, TX (US)

( * ) Notice: Subject to any disclaimer, the term of this patent is extended or adjusted under 35 U.S.C. 154(b) by 0 days. days.

(21) Appl. No.: 15/373,114

(22) Filed: Dec. 8, 2016

Related U.S. Application Data

(63) Continuation-in-part of application No. 15/112,173, filed as application No. PCT/US2015/058819 on Nov. 3, 2015.

(60) Provisional application No. 62/235,697, filed on Oct. 1, 2015, provisional application No. 62/085,327, filed on Nov. 27, 2014.

(51) Int. Cl.
| | |
|---|---|
| *H04W 24/00* | (2009.01) |
| *H04W 4/02* | (2018.01) |
| *H04W 4/00* | (2018.01) |
| *H04W 88/02* | (2009.01) |
| *H04W 88/08* | (2009.01) |

(52) U.S. Cl.
CPC ............. *H04W 4/02* (2013.01); *H04W 4/005* (2013.01); *H04W 88/02* (2013.01); *H04W 88/08* (2013.01)

(58) Field of Classification Search
CPC ... H04W 72/082; H04W 24/02; H04W 24/10; H04W 72/085; H04W 4/02; H04W 4/005; H04W 88/02; H04W 88/08
USPC ....... 455/456.3, 67.11, 63.1, 452.2, 522, 450
See application file for complete search history.

(56) References Cited

U.S. PATENT DOCUMENTS

| | | | | |
|---|---|---|---|---|
| 6,463,295 B1* | 10/2002 | Yun | ........................... | H04L 1/20 455/522 |
| 7,454,218 B2* | 11/2008 | Mo | ..................... | H04B 1/71632 370/222 |
| 8,213,957 B2* | 7/2012 | Bull | .......................... | G01S 5/02 370/328 |
| 8,600,393 B2* | 12/2013 | Liu | ....................... | H04W 16/14 370/329 |
| 8,619,687 B2* | 12/2013 | Choudhury | ....... | H04W 72/0426 370/329 |
| 8,798,653 B2* | 8/2014 | Miao | ................... | H04W 72/082 455/226.1 |
| 9,549,411 B2* | 1/2017 | Miao | ...................... | H04W 24/02 |
| 9,674,723 B2* | 6/2017 | Siomina | ................ | H04J 3/0685 |

(Continued)

*Primary Examiner* — Marceau Milord
(74) *Attorney, Agent, or Firm* — Brett A. Schenck

(57) ABSTRACT

Apparatus, system or method to improve communications in a wireless communication network. Steps may include sending specific information to user equipment or adjacent base stations so that the user equipment and adjacent base stations can determine interference levels in sidelink communications. The apparatus may include a location-estimation component interconnected with a self-tracking component and a signal-detection component. The apparatus may include a proximity system implemented using instructions stored in a non-transitory computer readable medium and the proximity system may be usable to locate one or more target transmitters. In some embodiments, the system may include other modules such as a localization module; a proximity-description module; and a proximity-display module. The proximity system may also include a proximity advertisement module, which includes an access management component; an ownership management component; and a content management component.

5 Claims, 17 Drawing Sheets

(56) References Cited

U.S. PATENT DOCUMENTS

| | | | | |
|---|---|---|---|---|
| 9,736,798 | B2* | 8/2017 | Sorrentino | H04W 52/383 |
| 2009/0270043 | A1* | 10/2009 | Miyoshi | H04W 28/22 |
| | | | | 455/67.11 |
| 2011/0085457 | A1* | 4/2011 | Chen | H04L 1/1812 |
| | | | | 370/252 |
| 2011/0319025 | A1* | 12/2011 | Siomina | H04B 7/024 |
| | | | | 455/63.1 |
| 2012/0026896 | A1* | 2/2012 | Li | H04L 1/0003 |
| | | | | 370/248 |
| 2013/0142100 | A1* | 6/2013 | Vrzic | H04J 11/0053 |
| | | | | 370/312 |
| 2014/0099967 | A1* | 4/2014 | Egner | H04W 4/028 |
| | | | | 455/452.2 |
| 2014/0105047 | A1* | 4/2014 | Tellado | H04W 24/10 |
| | | | | 370/252 |
| 2014/0105048 | A1* | 4/2014 | Tellado | H04W 24/10 |
| | | | | 370/252 |
| 2014/0105136 | A1* | 4/2014 | Tellado | H04L 5/0058 |
| | | | | 370/329 |
| 2014/0128057 | A1* | 5/2014 | Siomina | H04J 3/0685 |
| | | | | 455/423 |
| 2014/0378150 | A1* | 12/2014 | Li | H04W 52/46 |
| | | | | 455/450 |
| 2016/0094285 | A1* | 3/2016 | Ayoughi | H04W 16/28 |
| | | | | 370/317 |
| 2016/0135211 | A1* | 5/2016 | Panigrahi | H04W 4/005 |
| | | | | 370/329 |
| 2016/0150580 | A1* | 5/2016 | Kim | H04W 72/04 |
| | | | | 370/329 |
| 2016/0204885 | A1* | 7/2016 | Sorrentino | H04W 72/04 |
| | | | | 455/67.11 |

* cited by examiner

| Information Element / Group Name | Presence | Range | Information Element type and reference | Semantics description | Criticality | Assigned Criticality |
|---|---|---|---|---|---|---|
| Message Type | M | | 9.2.13 | | YES | ignore |
| Cell Information | M | | | | YES | ignore |
| >Cell Information Item | | 1 .. <maxCellinEvolved Node B> | | | EACH | ignore |
| >>Cell Identification | M | | ECGI 9.2.14 | Identification of the source cell | – | – |
| >>Uplink Interference Overload Indication | O | | 9.2.17 | | – | – |
| >>Uplink High Interference Information | | 0 .. <maxCellinEvolved Node B> | | | – | – |
| >>>Target Cell Identification | M | | ECGI 9.2.14 | Identification of the cell for which the High Interference Indicator is meant | – | – |

FIG.3A

| Information Element / Group Name | Presence | Range | Information Element type and reference | Semantics description | Criticality | Assigned Criticality |
|---|---|---|---|---|---|---|
| >>>Uplink High Interference Indication | M | | 9.2.18 | | – | – |
| >>>Uplink High Interference Indication 2 | O | | Defined below. | | – | – |
| >>Relative Narrowband Tx Power (RNTP) | O | | 9.2.19 | | – | – |
| >>ABase Stations Informatio | O | | 9.2.54 | | YES | ignore |
| >>Invoke Indication | O | | 9.2.55 | | YES | ignore |
| >>Intended Uplink-Downlink Configuration | O | | ENUMERATED(sa0, sa1, sa2, sa3, sa4, sa5, sa6,...) | One of the Uplink-Downlink configurations defined in TS 36.211 [10]. The Uplink subframe(s) in the indicated configuration is subset of those in SIB1 Uplink-Downlink configuration. This Information Element applies to TDD only. | YES | ignore |

FIG.3B

| Information Element / Group Name | Presence | Range | Information Element type and reference | Semantics description | Criticality | Assigned Criticality |
|---|---|---|---|---|---|---|
| >>Extended Uplink Interference Overload Info | O | | 9.2.67 | This Information Element applies to TDD only. | YES | ignore |
| >>CoMP Information | O | | 9.2.74 | | YES | ignore |
| >>Dynamic Downlink transmission information | O | | 9.2.77 | | YES | ignore |

M in the Presence Column means Mandatory.
O in the Presence Column means Optional.

FIG.3C

| Information Element / Group Name | Presence | Range | Information Element type and reference | Semantics description | Criticality | Assigned Criticality |
|---|---|---|---|---|---|---|
| Message Type | M | | 9.2.13 | | YES | ignore |
| Cell Information | M | | | | YES | ignore |
| >Cell Information Item | | 1 .. <maxCellinEvolved Node B> | | | EACH | ignore |
| >>Cell Identification | M | | ECGI 9.2.14 | Identification of the source cell | – | – |
| >>Uplink Interference Overload Indication | O | | 9.2.17 | | – | – |
| >>Uplink High Interference Information | | 0 .. <maxCellinEvolved Node B> | | | – | – |
| >>>Target Cell Identification | M | | ECGI 9.2.14 | Identification of the cell for which the High Interference Indicator is meant | – | – |

FIG.4A

| Information Element / Group Name | Presence | Range | Information Element type and reference | Semantics description | Criticality | Assigned Criticality |
|---|---|---|---|---|---|---|
| >>>Uplink High Interference Indication | M | | 9.2.18 | | – | – |
| >>>Sidelink information | O | TBD | TBD | TBD | TBD | TBD |
| >>Relative Narrowband Tx Power (RNTP) | O | | 9.2.19 | | – | – |
| >>ABase Stations Information | O | | 9.2.54 | | YES | ignore |
| >>Invoke Indication | O | | 9.2.55 | | YES | ignore |
| >>Intended Uplink-Downlink Configuration | O | | ENUMERATED(sa0, sa1, sa2, sa3, sa4, sa5, sa6,...) | One of the Uplink-Downlink configurations defined in TS 36.211 [10]. The Uplink subframe(s) in the indicated configuration is subset of those in SIB1 Uplink-Downlink configuration. This Information Element applies to TDD only. | YES | ignore |

FIG.4B

| Information Element / Group Name | Presence | Range | Information Element type and reference | Semantics description | Criticality | Assigned Criticality |
|---|---|---|---|---|---|---|
| >>CoMP Information | O | | 9.2.74 | | YES | ignore |
| >>Dynamic Downlink transmission information | O | | 9.2.77 | | YES | ignore |

| Range bound | Explanation |
|---|---|
| maxCellinEvolved Node B | Maximum no. cells that can be served by an Evolved Node B. Value is 256. |

FIG.4C

METHODS AND APPARATUS FOR ENABLING PROXIMITY SERVICES IN MOBILE NETWORKS

CROSS-REFERENCE TO RELATED APPLICATIONS

This application is a continuation in part of U.S. patent application Ser. No. 15/112,173, filed 16 Jul. 2016; application Ser. No. 15/112,173 was a continuation of, and a national stage entry of, PCT/US2015/058819 filed 3 Nov. 2015 with article 19 amendments filed Mar. 14, 2016; PCT/US2015/058819 claimed the priority benefit of U.S. Provisional Application No. 62/085,327, filed 27 Nov. 2014, and U.S. Provisional Application No. 62/235,697, filed 1 Oct. 2015; the entire contents of all of these applications are hereby incorporated herein by reference.

TECHNICAL FIELD

In the field of wireless communication systems, methods and devices are disclosed that enable individual mobile devices to determine if a device to device link within a cell may be created and how these devices should communicate.

BACKGROUND

This Background section of this specification is intended to provide a background or context to the invention that is recited in the claims. The description herein may include concepts that could be pursued, but are not necessarily ones that have been previously conceived or pursued, and thus should not be considered prior art unless it is expressly so stated.

The following abbreviations that may be found in the specification and/or the drawing figures are defined as follows:
3GPP: third generation partnership project;
ACK/NACK: acknowledgement/negative acknowledgements;
AP: access point;
API: application programming interfaces;
ACCS: autonomous component carrier selection;
BAC: blind admission control;
CDF: cumulative distribution function;
CUE: cellular user equipment;
CQI: channel quality indicator;
CRC: cyclic redundancy check;
CSI: channel state information;
DAC: distributed admission control;
D2D: device to device;
D2DBSIE: device to base stations information element;
D2DIE: device to device information element;
D2DIE2: device to device information element 2;
dB: decibels;
dBm: decibel-milliwatts;
eNB or eNodeB: E-UTRAN Node B (evolved Node B/base station); used interchangeably with "access point";
EPC: enhanced power control;
E-UTRAN: evolved UTRAN (LTE);
FDM: frequency division multiplexing;
HII: high interference indication;
IP: Internet Protocol;
LTE: long term evolution;
LTE-A: LTE advanced;
MAC: media access control;
M2M: machine-to-machine;
OAC: optimal admission control;
OLPC: open loop power control;
$P_D$: power control function;
PDCCH: physical downlink control channel;
PHY: physical layer;
PMI: pre-coding matrix index;
PRB: physical resource block;
ProSe: proximity-based services;
PSCCH: physical sidelink control channel;
PSSCH: physical sidelink shared channel;
PSD: power spectral density (dBm/Hz);
RSRP: reference signal receive power;
RE: resource elements;
RI: rank indicator;
RS: reference signals;
SCI: sidelink control information;
SINR: signal to interference plus noise ratio;
TPC: transmit power control;
UE: user equipment, where UEs is the plural;
UL: uplink (UE to eNB);
UPP: universal plug and play;
UTRAN: universal terrestrial radio access network; and
WLAN: wireless local area network.

The following definitions of terms used herein are applicable:
3GPP: The 3rd Generation Partnership Project provides specifications that define 3GPP technologies;
"access point": In cellular networks like LTE-A, it is a conceptual point within the radio access network performing radio transmission and reception: An access point is associated with one specific cell, i.e. there exists one access point for each cell. It is an end point of a radio link. In other wireless systems like Wi-Fi, it is a device that allows wireless devices to connect to a wired network using Wi-Fi, or related standards; "Access point" in this application refers to a conceptual point within the radio access network, unless otherwise specified;
"base station" or "eNodeB" or "eNB": A base station is a network element in radio access network responsible for radio transmission and reception in one or more cells to or from the user equipment. Each eNodeB has a baseband processing unit. Each baseband processing unit is connectable to multiple radio units (either remote radio heads or radio cards), which enable transmit and receive functions involving radio frequency signals. Thus, each radio unit is connected to one or more antennas serving a particular direction, and thus forming a sector or a cell (in the logical naming sense), as shown in FIG. 2B;
"cell": A radio network area that can be uniquely identified by a mobile terminal from a (cell) identification that is broadcasted over a geographical area from one access point.
"D2DBSIE": parameters or signalings that carry stastical information of the tolerable performance loss of the primary UEs such as for example, the total amount of interference from the device to device links that is tolerable by the user equipment in an uplink; propagation constants related to a channel model; coverage area for device to device links; and an average sum of channel gain of existing device to device links to the base stations.
"D2DIE": parameters or signalings that carry statistical information of existing active device to device links, such as for example, density or number of active device to device links; propagation constants related to a channel model; and a coverage area for device to device links.
"D2DIE2": parameters or signalings sent between adjacent access points or base stations and may include the density or the number of active device to device links in the serving area of the base station and may include a high interference indicator for sidelink communications in the wireless communications network;

"D2DIE3": parameters or signalings sent from one user equipment of a device to device pair to adjacent base stations to indicate that in the near future, potential transmission between the sidelink (device to device) communications will be scheduled in certain parts of the radio resources, These include bandwidth, frequency division multiplexing (FDM) symbols, or resource blocks, by the device to device pair.

"user equipment" or "UE," or "mobile terminal" or "terminal" is a device that allows a person to access to network services. The interface between the UE and the network is the radio interface;

"PSCCH": Physical Sidelink Control Channel, a transmission resource pool and physical channel defined in a sidelink carrying the control information. A physical channel is defined by code, frequency, relative phase (I/Q), or time-slot, and so on; and "PSSCH": Physical Sidelink Shared Channel, a transmission resource pool and physical channel defined for a sidelink carrying data.

More and more devices are becoming connected. Market research by others suggests that in 2020 the total number of connected devices will grow from 9 billion today to 24 billion, with half incorporating mobile technologies. These connected devices can be devices such as smart meters, but increasingly all kinds of consumer electronic devices (e.g. photo cameras, navigation devices, e-books, hi-fi equipment, and televisions) are connected. Many of these connections are among devices in close proximity and there is evolving demand for enabling proximity services from different perspectives. This is described in CISCO, "Cisco Visual Networking Index: Global Mobile Data Traffic Forecast Update," 2014. For example social apps, hyper-local marketing and classifieds may be based on proximity.

Proximity will also be a new vector for mobile advertising and there will be growing need to enable new types of advertising for proximity services. For example a customer in a mall will prefer to receive information or ads related to the shops inside this mall, rather than those worldwide.

Many consumer electronic devices will need to communicate with other consumer electronic devices in their neighborhood. For example a photo camera can communicate with a printer, or a media server can communicate with hi-fi equipment.

Providing proximity-based services enables consumers to interact with their proximate environment in a spontaneous and direct way using their smartphone, and thus bring about a huge array of benefits for the consumer, for enterprises and in turn, for the operator.

As a value-added-service, proximity-based services offer the potential for huge gains for operators, including additional revenue gained from the consumers from access to services, from new marketing tools for enterprise customers, and from opportunities for revenue sharing with third-party's via developer Application Programming Interfaces (APIs).

A major economic opportunity of proximity-based services is for mobile operators to hold the rights to the spectrum that enables this functionality. The party holding the rights to the spectrum could act as a gatekeeper, controlling access to the services.

The start-of-the-art research and inventions related to proximity-based services and technologies may be summarized by a discussion of the 3rd Generation Partnership Project (3GPP). The 3rd Generation Partnership Project unites multiple telecommunications standard development organizations and provides the means to define systems for cellular telecommunications and network technologies.

IEEE 802.11 is a set of media access control (MAC) and physical layer (PHY) specifications for implementing wireless local area network (WLAN) computer communication in the 2.4, 3.6, 5, and 60 GHz frequency bands. The IEEE802.11 is hereby incorporated by reference herein. The IEEE 802.11 specifications are created and maintained by the IEEE LAN/MAN Standards Committee (IEEE 802). In IEEE 802.11, the primary UEs are the devices that communicate directly to the access point while the device to device pair could be two devices that communicate directly to each other. Within 3GPP, Proximity-Based Services (PBS) provide discovery of devices and communications between devices in proximity. Thus, Proximity-Based Services support communication between devices that are physically located close to each other.

Device-to-device (D2D) communications is enabled by cellular networks, e.g. 3GPP infrastructure that provides a generic communication capability that can generate a new revenue source for mobile network operators. As proximity based applications are growing fast, the demand of Device to Device communications will increase dramatically. Developing scalable Device to Device communications for systems like 3GPP is of paramount importance.

The main idea of Device to Device communications is to enable two devices in proximity to communicate directly with each other, re-utilizing the resources of primary cellular networks or using a set of orthogonal resources. Its impact on the performance of existing cellular UEs should be minimal. For example in Long Term Evolution-A, device to device links may share the uplink resources of the cellular network or use orthogonal resources.

When downlink resources are reused, device to device links may cause strong interference towards existing cellular user equipment, whereas in the case of sharing uplink resources, the interference caused by device to device links will affect only the base stations, where the impact has been determined to be less harmful.

As more device to device pairs exist in the network, the interference levels may increase to a point where the performance of both cellular and Device to Device networks could be seriously degraded. Thus, one of the main limitations on the scalability of Device to Device communications is interference control. To solve this potential problem, a careful interference coordination and power control technique is used to have scalable Device to Device communications to assure quality of service to both Device to Device UEs and existing cellular UEs.

When device to device links are added to the system, two main levels of interferences are generated: 1) A first level of interference caused by the cellular network, namely from existing cellular user equipment towards other base stations (inter-cell interference) and from Cellular User Equipment towards device to device links; and, 2) a second level of interference caused by Device to Device network, namely from device to device links towards the base stations and from device to device links towards other device to device links.

The first level of interference includes inter-cell interference. In the uplink of the last generation cellular networks the resources within each cell are allocated orthogonally resulting in zero intra-cell interference. However, the resources are shared by several cells causing inter-cell interference between the Cellular User Equipment and base stations of different cells. This problem is well known and there has been important research done in the last years.

There are numerous studies and proposals that form the background of addressing cellular interference. One proposal includes an adaptive soft frequency reuse scheme that decreases inter-cell interference improving the average throughput per UE. Another recommends an interference aware joint scheduling scheme based on proportional fairness. Others have studied the problem of resource allocation considering the impact of inter-cell interference while maintaining a frequency reuse of one. Studies have been published on the evaluation of the Long Term Evolution Open Loop Fractional Power Control and the closed loop power control considering the impact of inter-cell interference while giving an insight to the proper configuration of the design parameters.

For example, in the conventional power control for sidelink communications, the transmission power control formula for PSSCH or PSCCH is $$P_{D2D} = \min \left\{ \begin{array}{l} P_{CMAX,c} \\ 10\log_{10}(M_{D2D}) + P_{O\_D2D} + \alpha_{D2D} \cdot PL \end{array} \right\}_{dBm}$$

where $P_{CMAX,c}$ denotes the maximum UE output power on cell c and $M_{D2D}$ denotes the D2D transmission bandwidth in number of PRBs for the corresponding channel, e.g. PSSCH or PSCCH. $P_O{}^{D2D}$ and $\alpha_{D2D}$ are the two power control parameters (1215) that are adjustably configured by higher layers for the corresponding channel and transmission mode. Thus, the power control parameters (1215) are configured by higher layers for the corresponding channel and transmission mode. The term PL is the downlink path loss estimate calculated in the UE for serving cell c in dB. This formula protects the serving cell from the interference of the sidelink communications. In special situations where this protection is not needed, the UE can be instructed by the eNB to use the maximum UE output power through D2D grant (i.e., TPC=1).

In Long Term Evolution Inter-Cell Interference Coordination, a proactive indicator, known as the "High Interference Indicator," can be sent by an Evolved Node B (eNodeB or eNB) to its neighboring Evolved Node B to inform them that it will, in the near future, schedule uplink transmissions by one or more cell-edge user equipment in certain parts of the bandwidth, and therefore that high interference might occur in those frequency regions. As illustrated in FIG. 2A, X2 is the name of the interface that connects one Evolved Node B to another Evolved Node B. S1 is the interface for the communications between Evolved Node B and a Mobility Management Entity (MME).

Neighboring cells may then take this information into consideration in scheduling their own UEs to limit the interference impact. This can be achieved either by deciding not to schedule their own cell-edge user equipment in that part of the bandwidth and only considering the allocation of those resources for cell-center UEs requiring less transmission power, or by not scheduling any UE at all in the relevant Resource Blocks (RBs).

The High Interference Indicator (HII) is comprised of a bitmap with one bit per Resource Block, and, like the Overload Indicator (OI), is not sent more often than every 20 milliseconds. The High Interference Indicator bitmap is addressed to specific neighbor Evolved Node Bs. On the other hand, the Overload Indicator, being a reactive indicator, can be exchanged over an X2 application protocol interface to indicate physical layer measurements of the average uplink interference plus thermal noise for each Resource Block. The Overload Indicator can take three values, expressing low, medium, and high levels of interference plus noise. In order to avoid excessive signaling load, it cannot be updated more often than every 20 milliseconds.

SUMMARY OF INVENTION

In some embodiments, the invention may be a base station (e.g. a base station device) in a wireless communication network, comprising multiple base stations. Here each base station can be configured to send and receive communications to another base station in the wireless communication network, as well as to a first plurality of user equipment. In this embodiment, a second plurality of user equipment may be created by each of the user equipment in the first plurality of user equipment that has formed the device to device communication. The base station may be configured to perform various functions, such as to collect statistical information on active device to device communications. The base station may also be configured to send a message to a second base station in the wireless communication network. This message may comprise this statistical information on active device to device communications. This message may also enable the base stations to use this statistical information to determine an interference level from device to device communications.

In an alternative embodiment, the invention may be a user equipment (e.g. a user equipment device) receiving messages from the base station. The user equipment is configured to implement the steps of: receiving a message comprising statistical information on active device to device links from a base station in a wireless communication network. According to this method, the user equipment will; determine whether or not to connect with another user equipment by using this statistical information to calculate an interference level, which is usable in determining transmit power for device to device communications.

In another embodiment, the invention may comprise a base station in a wireless communication network. This wireless communication network will typically comprise multiple base stations. Here each base station is able to send and receive communications to another base station in the wireless communication network and also to a first plurality of user equipment. Here a second plurality of user equipment is created by each of the user equipment in the first plurality of user equipment that has formed the device to device communications. In this embodiment, the base station is configured to: send power control parameters to a user equipment in the second plurality of user equipment. These power control parameters are usable in this user equipment in the second plurality of user equipment to determine a power control function, "PD". This power control function is used to determine a calculated value of transmit power. This calculated value is selected from the group consisting of: the power control function; and a conventional power control value whose path loss is the path loss to a first base station.

In an alternative embodiment, the invention may comprise user equipment configured to implement steps of: receiving power control parameters from a first base station in a wireless communication network. The user equipment is configured to use the power control parameters to determine a power control function, "$P_D$". The user equipment thereafter uses this power control function to determine a calculated value of transmit power. This calculated value may be selected from the group consisting of: the power control function; and a conventional power control value whose path loss is the path loss to the first base station.

In another embodiment, the invention may comprise a location-estimation component. This location-estimation component may comprise an interconnection with a self-tracking component, and a signal-detection component. This interconnection is configured to enable provision of data to the location-estimation component. The location-estimation component is configured to estimate location information based on data provided by the self-tracking component, and the signal-detection component. Here the location information may be selected from the group consisting of: geographic coordinates of one or more target transmitters which broadcast signals that can be detected by the signal-detection component; a localization-related parameter for such geographic coordinates; and a direction the location-estimation component would have to go to approach the one or more target transmitters. In this embodiment, the self-tracking component may comprise sensors configured to perform measurements of location information of the location-estimation component. The signal-detection component may be configured to detect one or more signal properties at locations selected from among those where the self-tracking component performs a measurement and the signal properties contain distance information between the location-estimation component and the one or more target transmitters. In another embodiment, the invention may comprise a non-transitory computer readable medium storing instructions thereon. These instructions may comprise instructions, that when implemented on a computer, enable the computer to receive proximity information of one or more target transmitters within a plurality of target transmitters from a localization module. These instructions may further enable the computer to implement steps of a) reading or storing information related to the one or more target transmitters from a storage component that comprises non-transitory computer readable memory; b) reading and processing information of the one or more target transmitters using a user-interface component; c) downloading or uploading information related to target transmitters from the Internet using an optional Internet access component; d) sending the information of the target transmitters to a proximity-display module for display. Here the localization module is capable of estimating location information of the one or more target transmitters within the plurality of target transmitters and, and may comprise a self-tracking component, a signal-detection component, and a location-estimation component. In this embodiment, the location-estimation component may be configured to estimate location information based on data provided by the self-tracking component, and the signal-detection component. These instructions are used to build a proximity system. Here the location information may be selected from the group consisting of: geographic coordinates of the one or more target transmitters who broadcast signals that were detected by the signal-detection component; a localization-related parameter for such geographic coordinates; and a direction the localization module would have to go to approach the one or more target transmitters. In this embodiment, the self-tracking component, the signal-detection component and the location-estimation component are interconnected so as to enable provision of data to the location-estimation component. The instructions may further enable the computer to implement steps of:

using an Internet connection between said computer and one or more remote servers to upload material of a target transmitter in the plurality of target transmitters to said one or more remote servers; and manage the proximity information of each verified target transmitter to the said one or more remote servers, wherein said material can be used to verify ownership of a target transmitter in the plurality of target transmitters that once verified becomes a verified target transmitter.

Technical Problem

There is a need for greater efficiency and interference coordination in device to device communications, which can enable far greater automated interconnectivity between devices in proximity to each other. This need is for a simple device and method that provides a power control function for determining the minimum power necessary transmit a signal for reliable sidelink data communications (communications between devices); rather than simply the conventional power value, i.e. the power control value whose path loss is the path loss to the serving station; and for improved interference coordination for sidelink communications.

Despite the obvious potential benefits and revenue opportunities, competition is present from existing similar proximity-based services to some extent through Wireless Fidelity (Wi-Fi), and/or Bluetooth applications. Examples of proximity-based services are Digital Living Network Alliance (DLNA) and Universal Plug and Play (UPP).

Digital Living Network Alliance and Universal Plug and Play enable the discovery of other devices of interest, after which Internet Protocol (IP) level data communication is made possible between the devices. Digital Living Network Alliance and Universal Plug and Play, however, only work within the confines of a single wireless local area network (WLAN) or a single local area network (LAN). These have, however, seen limited mainstream adoption up to now, which may be due to the fact that these existing solutions suffer a number of limitations including range and scalability issues; privacy concerns, as well as a huge drain on battery resources, which limit their use by consumers.

Ultimately, Long Term Evolution Device-to-Device (LTED2D), which is also called "sidelink" communications in 3rd Generation Partnership Project, provides a universal platform for proximity services. Long Term Evolution Device-to-Device opens the potential for a host of new service opportunities, while also achieving significant performance and efficiency benefits on the Long Term Evolution (LTE) networks.

From what is known in this field, there is a need for a system and methods achieving low-complexity interference coordination and localization techniques for proximity services.

Solution To Problem

The solution disclosed herein defines a new generic framework to coordinate the communications between the proximity devices and the base stations so that the interferences generated by the proximity devices are effectively controlled to achieve high network peroformance.

This solution of interference controls goes beyond first level interferences addressed in current technology and addresses second level interferences to enable high capacity D2D communications.

The generic framework consists of distributed mode selection, power control, and inter-cell interference coordination to enable scalable direct communications between devices in proximity and localization of devices in proximity to provide more efficient services.

This generic framework has the potential to maximize the number of simultaneous active device to device links, thus maximizing network frequency reuse and network throughput.

This framework provides a new and effective method to assure quality of service to both cellular UEs and Device to Device UEs.

This generic framework includes three key innovative technologies to greatly enhance the provision of proximity-based services in mobile wireless networks. These key innovative technologies include: A new air interface consisting of power control and interference coordination that is implemented in Long Term Evolution-A cellular networks or like networks for scalable Device to Device communications and interference control; and an autonomous localization technique for finding wireless transmitters in proximity to provide efficient proximity services.

These key innovative technologies, while forming a holistic framework for proximity-based services, may be implemented independently in practice, wherever it is necessary or convenient to do so.

Advantageous Effects of Invention

To enhance the efficiency of proximity services, a preferred embodiment introduces an autonomous location scheme to enable a device to locate other wireless devices in proximity.

This autonomous location scheme enables the device to approach the adjacent devices in proximity and communicate with lesser transmission power, which effectively reduces the second level interference to the network.

The advanced technology disclosed herein may be implemented in any form of device-to-device direct communications. This means that any type of proximity-based services with direct communications between UEs are able to use it. It can be integrated in currently technologies as in, for example: Wi-Fi-direct; Device to Device communications in cellular networks, including Machine-to-Machine (M2M) communications, and so on.

BRIEF DESCRIPTION OF DRAWINGS

The drawings illustrate preferred embodiments of the methods and apparatus for enabling proximity services in mobile networks according to the disclosure. The reference numbers in the drawings are used consistently throughout. New reference numbers in FIG. 2A and FIG. 2B are given the 200 series numbers. Similarly, new reference numbers in each succeeding drawing are given a corresponding series number beginning with the figure number.

FIG. 3A is the first part of a table of load information describing a message sent by an Evolved Node B to neighboring Evolved Node Bs to transfer load and interference co-ordination information.

FIG. 3B is the second part of the table of load information describing a message sent by an Evolved Node B to neighboring Evolved Node Bs to transfer load and interference co-ordination information.

FIG. 3C is the third part of the table of load information describing a message sent by an Evolved Node B to neighboring Evolved Node Bs to transfer load and interference co-ordination information.

FIG. 4A is the first part of a table showing information related to sidelink communications that is carried in the load information between Evolved Node Bs.

FIG. 4B is the second part of the table showing information related to sidelink communications that is carried in the load information between Evolved Node Bs.

FIG. 4C is the third part of the table showing information related to sidelink communications that is carried in the load information between Evolved Node Bs.

DESCRIPTION OF EMBODIMENTS

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and, therefore, other embodiments may be utilized and structural, and operational changes may be made, without departing from the scope of the present invention.

Figure 1:
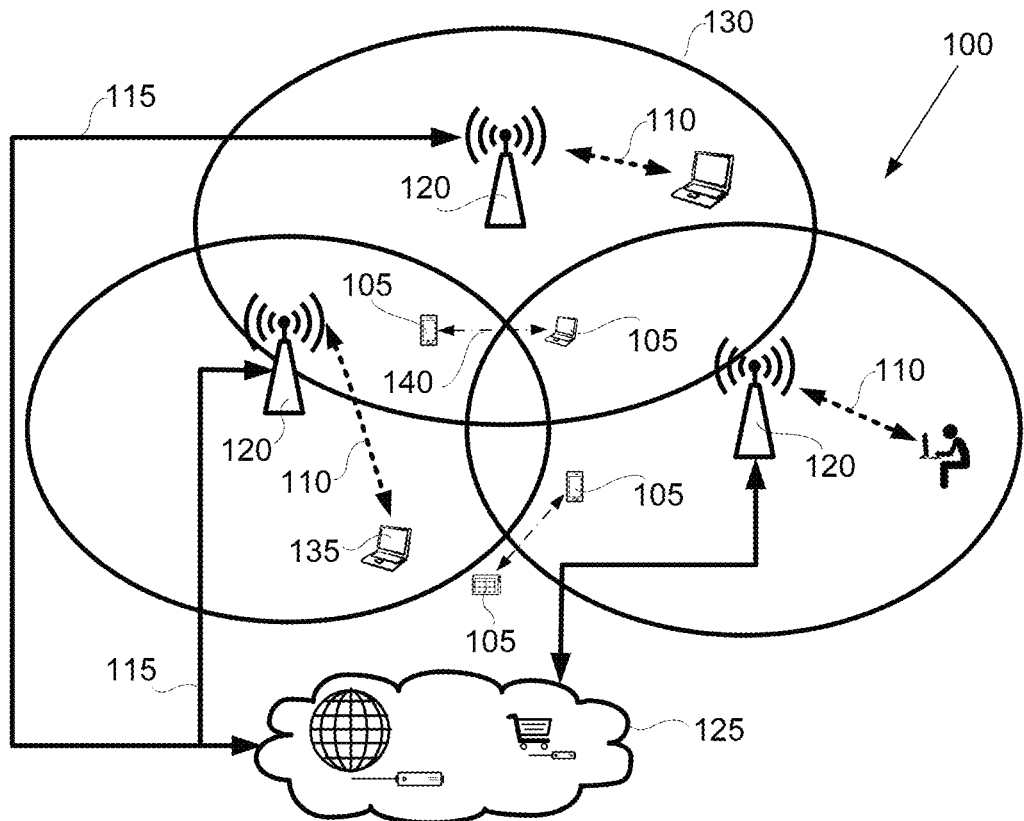
FIG. 1 is an illustration of logic interfaces in a network known in the prior art.

FIG. 1 illustrates four types of elements in a radio access network: a device in proximity, also referred to as user equipment (105), a primary user equipment, which is user equipment that communicates directly with the network, and a base station (210), also known as eNodeB (120), which manages a cell (130) or several cells. FIG. 2B illustrates an eNodeB and cell (205). The base station (210) is called an access point in Wi-Fi systems and is called an eNodeB in 3GPP network infrastructure. Each base station (210) is responsible for radio transmission and reception in one or more cells to or from the user equipment. Each access point, which is a conceptual point, is associated with one specific cell, and it is an end point of a radio link between the UE and radio access network.

Figure 2A:
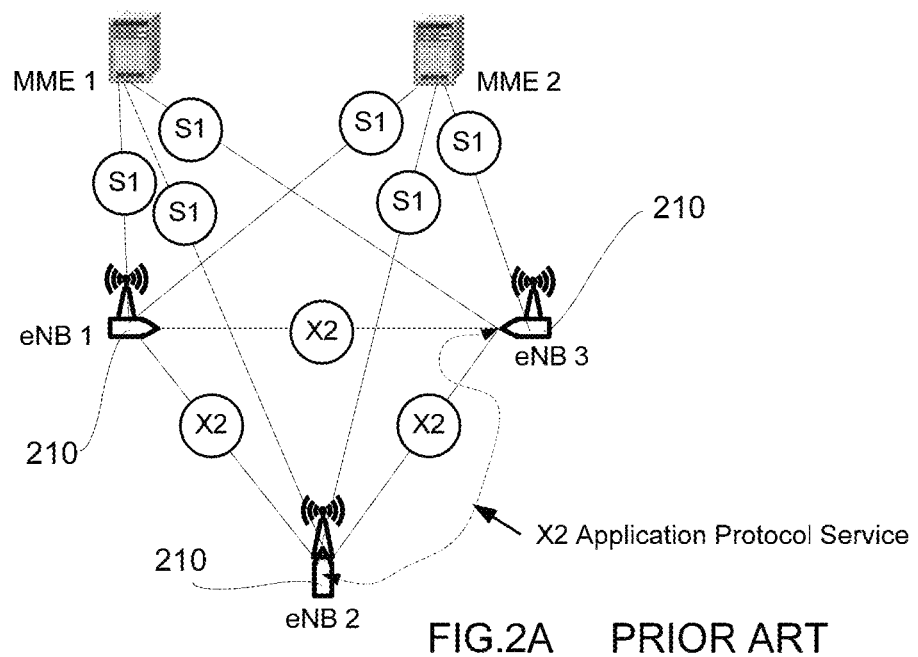
FIG. 2A is an illustration of logic interfaces of network known in the prior art.
Figure 2B:
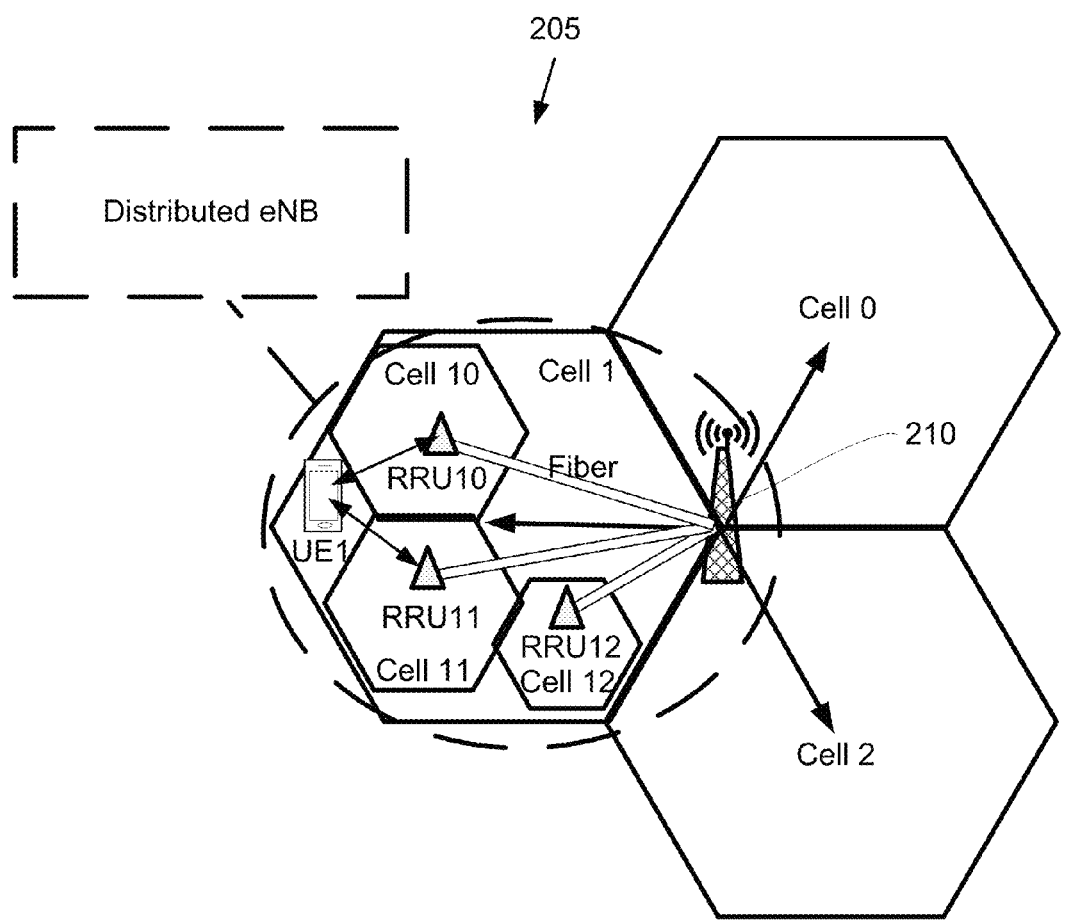
FIG. 2B is an illustration of a base station (eNB) and cells known in the prior art.
Figure 7:
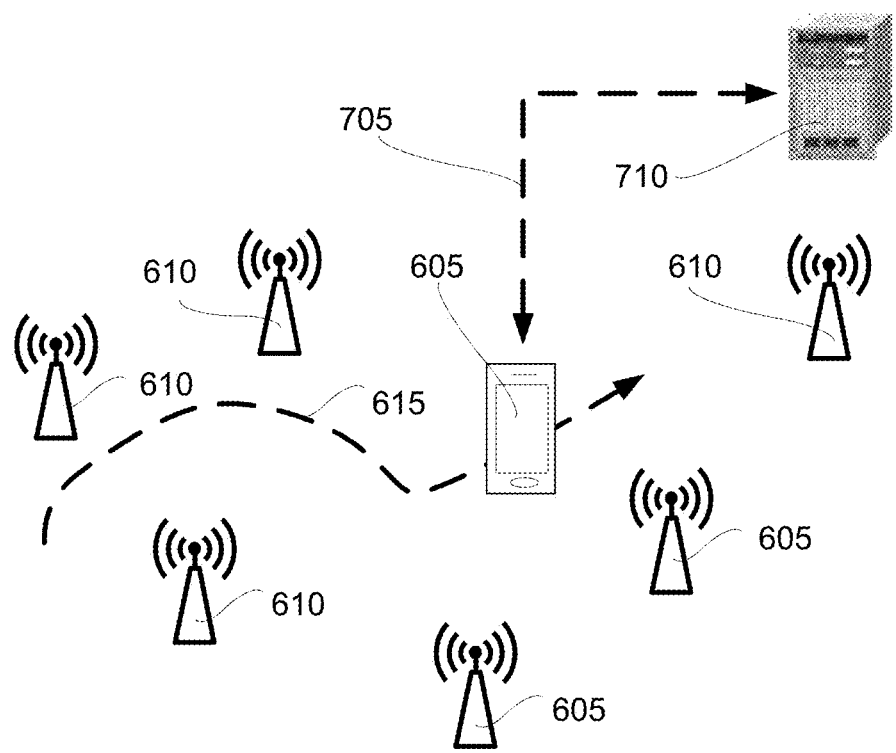
FIG. 7 illustrates implementation of the localization module in a mobile device to locate target transmitters in proximity where the mobile device is connected to the Internet and a remote sever.
Figure 9:
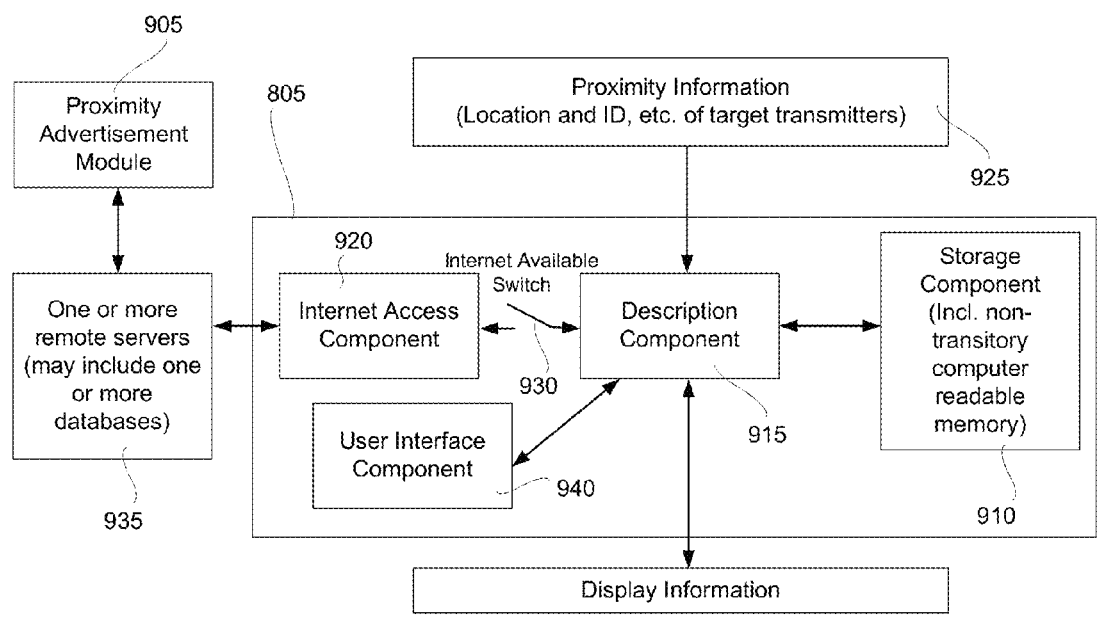
FIG. 9 is a block diagram illustrating a proximity description module.

The core network, also illustrated in FIG. 2A, is the medium to connect to the Internet (125) and a remote server (710), shown in FIG. 7, or one or more remote servers (935), shown in FIG. 9. These remote servers may include one or more databases, shown in FIG. 9 and FIG. 10. A server group (one or more remote servers (935)) preferably includes multiple servers and data bases in the core network, which may provide services together and may communicate with each other for functional purposes.

An example of a remote server (710) or one or more remote servers (935) accessed through the Internet (125) is an advertisement server. The advertisement server stores in non-transitory computer readable memory advertisements used in online marketing and delivers these advertisements to mobile terminals, such as for example website visitors. Website users typically include mobile users of user equipment (105), such as, for example, laptops, desktops, tablets and smartphones.

As shown in FIG. 2A, the core network may also serve as the X2 and S1 interfaces between the base stations. S1 and X2 are known interfaces in 3GPP network nodes: The S1 interface separates E-UTRAN and EPC; and the X2 interface is the interface between base stations (eNBs).

Each base station (210) is a component entity that controls the signaling of the UE and routes traffic between primary UEs and the core network. The wireless links for primary UEs and Device to Device UEs generate the two levels of interferences to each other.

The primary UEs communicate to the network directly. For example, in 3GPP, the primary UE is user equipment (105) that communicates directly to the eNodeBs. In Wi-Fi, the primary user equipment (135) a devices that communicates directly to a Wi-Fi access point. The devices in proximity are referred to herein as Device to Device (D2D) user equipment, user equipment (105) or proximity devices. A device to device pair involves two devices, that is for example, a first user equipment that communicates with a second user equipment. The communications of a D2D pair may also be called sidelink communications. Note that Device to Device communications may be present without the existence of primary UEs or base stations.

A preferred embodiment disclosed herein includes a set of technologies to determine mode selection and transmission power and interference coordination for Device to Device communications.

Mode selection refers to procedures to decide if a pair of devices in proximity should communicate directly with each other or through the base stations (210). These technologies work together to coordinate two levels of interferences generated by Device to Device communications to achieve the optimal network performance.

The set of technologies preferably enables two devices in proximity of each other to locate each other and track them so that they are better able to move closer to each other. Such tracking and knowledge of proximity enables the two devices to employ a higher data rate transfer with lower interference to the network, which further improves network performance.

Information Elements

In a preferred embodiment, the network, e.g. an access point, a base station, or a group of base stations, keeps the track of stastical information relating to active device to device links in its serving area (one or more cells). The network sends to a mobile device a parameter, preferably a set of parameters or signalings, named Device to Device Information Element (D2DIE), that carries the statistical information of existing active device to device links. The Device to Device Information Element may be used to calculate, i.e., derive the tolerable mutual interference among potential device to device links in a certain area.

Therefore, in one embodiment of the invention, a base station apparatus is configured to send to a mobile device the D2DIE, that carries the statistical information of existing active device to device links. The D2DIE may be used to calculate, i.e., derive the tolerable mutual interference among potential device to device links in a certain area.

In one embodiment of the invention, a user equipment is configured to receive the D2DIE, that carries the statistical information of existing active device to device links, from a base station. The D2DIE may be used by the user equipment to calculate, i.e., derive the tolerable mutual interference among potential device to device links in a certain area.

One example of the parameter that is carried in a Device to Device Information Element is the density or number of existing active device to device links in a certain area, e.g. cells. The density may then be used to derive the potential interference among different device to device links in the area. The higher the number of device to device links, the higher the mutual interference that may be expected to exist in the area.

A second example of the parameter is an indicator of Device to Device interference in the cell, where 1 means too much interference between device to device links and 0 means negligible interference among device to device links. Or the indicator can be of several, e.g. three, levels, where each level indicates the strength of interferences among device to device links. A bitmap can be used to indicate the corresponding interference levels on all resource blocks of interest. For example the bitmap has the format BIT STRING (1 . . . 110, . . . ); and wherein the Semantics description is: Each position in the bitmap represents a Physical Resource Block (first bit=PRB 0 and so on), for which value "'1" indicates 'high interference sensitivity' and value "0" indicates 'low interference sensitivity'.

Preferably, the Device to Device Information Element is used to control the inteference among different device to device links. The Device to Device Information Element may also be used to prevent too many device to device links to be admitted in the network. For example, when the Device to Device Information Element is carried in the discovery messages, it can help determine whether or not an active status for the user equipment will be in sidelink mode.

The transmission of the Device to Device Information Element may be cell specific or may be broadcasted by the network. In addition, the transmission of Device to Device Information Element may be user-equipment specific and sent to the user equipment (105) using dedicated resources.

In one example of transmission, an Evolved Node B broadcasts this parameter to a plurality of user equipment within its cell. In another example, several Evolved Node Bs may jointly determine this parameter and send it to a particular user equipment.

In another example of transmission, existing device to device links estimate the average amount of interference that has already existed among themselves and broadcast this parameter so that new device to device links can estimate the interference if they start data communications.

In a third example of transmission, the Device to Device Information Element is carried in the discovery messages from eNodeB to the D2D UE when a new device to device pair is established.

A mobile device is configured to receive the D2DIE and may use the statistical information in the D2DIE in its D2D communictions. For example, the statistical information may be used by the mobile device to determine whether or not to connect with another user equipment. For another example, the statistical information may also be used to calculate an interference level, which is usable in determining transmit power for device to device communications.

Preferably, base station (210) communicates with adjacent base stations, sending one or more parameters or signalings, named Device to Device Information Element 2 (D2DIE2), that includeds or carries the statistical information of the active device to device links in its own serving area.

There, a base station apparatus is configured to send to adjacent base stations one or more parameters or signalings, named D2DIE2, that includeds or carries the statistical information of the active device to device links in its own serving area. D2DIE2 may be used by adjacent base stations to determine an interference level from device to device communications.

A base station apparatus is configured to receive one or more parameters or signalings, named D2DIE2, that includeds or carries the statistical information of the active device to device links, from an adjacent base station. Said base station may use D2DIE2 to determine an interference level from device to device communications.

Thus, in a preferred method the wireless communication network (100) includes multiple base stations. The preferred method is utilizable in a wireless communication network. Each base station (210) is able to send and receive communications (110) to another base station in the wireless communication network. Each base station (210) is able to send and receive communications (110) and to a first plurality of user equipment. This first plurality of user equipment represents the user equipment (105) within the area served by the wireless communication network (100). A second plurality of user equipment is created by each of said user equipment in the first plurality of user equipment that has formed a pairing with another user equipment. For example, the second plurality of user equipment may be two mobile devices that are in sidelink communications. Each such pairing defined as a device to device link. In the method the base station (210) implements steps of: controlling a message from a first base station in the wireless communication network to user equipment (105) in the first plurality of user equipment, the message comprising statistical information on active device to device links; and enabling each user equipment (105) in the first plurality of user equipment to determine whether or not to connect with another user equipment in the first plurality of user equipment based using the statistical information to calculate an interference level for a new device to device link (140). The calculations are performed in accordance with the disclosure herein.

The statistical information includes at least one of: the density of active device to device links; and a high interference indicator for device to device communications; wherein said statistical information is usable by each user equipment (105) in the first plurality of user equipment to determine a projected interference level for a new device to device link (140).

The method may also include a steps of: sending the statistical information from the first base station in the wireless communication network to a second base station in the wireless communication network; forming the high interference indicator for device to device communications to include a binary indicator where 1 means high interference and 0 means negligible interference; and forming the high interference indicator for device to device communications to include multiple levels of interference power. The high interference indicator may be obtained by adding one bit into the existing High Interference Indicator of Long Term Evolution-A specification and this one bit is used to indicate whether or not the High Interference Indicator is from the sidelink communications.

Device to Device Information Element 2 may be used to derive a tolerable mutual interference from device to device links in areas served by the adjacent base stations.

A first example of a parameter that may be carried in Device to Device Information Element 2 is the density or number of active device to device links in the serving area of the base station, i.e. those devices that the base station or cell serves. The Device to Device Information Element 2 can be used to derive the potential interference from these device to device links to the device to device links in adjacent cells. The higher the number of device to device links, the higher the interference may be expected.

A second example of a parameter that may be carried in Device to Device Information Element 2 is a high Device to Device interference indicator in a cellular area, where 1 means too much interference between device to device links and 0 means negligible interference among device to device links. Alternatively, the indicator may be one of several levels, e.g. three levels, where each level indicates the strength of interferences among device to device links. A bitmap can be used to indicate the corresponding interference levels on all resource blocks of interest. For example the bitmap has the format BIT STRING (1 ... 110, ... ); and wherein the Semantics description is: Each position in the bitmap represents a Physical Resource Block (first bit=PRB 0 and so on), for which value "'1" indicates 'high interference sensitivity' and value "0" indicates 'low interference sensitivity'.

Device to Device Information Element 2 is preferably exchanged on logic interfaces such as X2 or S1 interfaces, as shown in FIG. 2A.

Preferably, the network broadcasts a parameter or signaling, named Device to Base Stations Information Element (D2DBSIE), that carries stastical information of the tolerable performance loss of the primary UEs.

The network provides data on the maximum amount of interference that can be tolerated by primary user equipment (135), i.e. user equipment (105) directly connecting to the network, using the Device to Base Stations Information Element. For example, the parameter broadcast by the network may be a Signal-to-Interference-plus-Noise Ratio loss in decibels (dB) that can be tolerated by cellular users in 3GPP cellular networks.

Another example of the Device to Base Stations Information Element is the throughput loss that can be tolerated by the UEs connected directly to the base station.

A third example of the Device to Base Stations Information Element is a one bit indicator, where 1 means additional Device to Device communications are allowed and the resulting interference to the network is negligible; and 0 means additonal Device to Device communications will create too much interference and new Device to Device communications should not be allowed.

A forth example of the Device to Base Stations Information Element is an N-state indicator, which means K of the N levels of the interference generated by the Device to Device communications can be tolerated. A bitmap can be used to send Device to Base Stations Information Element to indicate the corresponding tolerable interference levels on all resource blocks of interest.

Novel Transmission Power Control Function

A novel feature of a preferred embodiment disclosed herein is the power control for the transmission of sidelink communications to be the minimum of $P_D$ and the conventional power control. As introduced in the BACKGROUND section, supra, in the conventional power control, path loss in the power control formula is the path loss from the user equipment to the serving cell and protects the serving cell from high interference from the sidelink communications. The power control function, $P_D$ is used to determine the minimum transmit power necessary for reliable data communications of the sidelink. Selecting the minimum of $P_D$ and the conventional power control as the transmission power, ensures a minmum transmission power for sidelink communications, which reduces the overall second-level interference and enables more D2D links to communiate at the same time.

Thus, in a preferred method utilizable in a wireless communication network (100), the wireless communication network (100) comprising multiple base stations, wherein each base station (210) is able to send and receive communications (110) to another base station in the wireless communication network (100) and to a first plurality of user equipment, wherein a second plurality of user equipment is created by each of said user equipment (105) in the first plurality of user equipment that has formed a pairing with another user equipment, each such pairing defined as a device to device link (140), the method comprising the step of: sending power control parameters (1215) from a first base station in the wireless communication network (100) to the second plurality of user equipment, the power control parameters (1215) usable in each user equipment (105) in the second plurality user equipment to determine a power control function, $P_D$, and thereafter use the power control function to determine a calculated value, the calculated value selected from the group consisting of: a minimum transmit power for reliable data communications of the device to device link (140); and a conventional power control value whose path loss is the path loss to the first base station.

This preferred method utilizable in a wireless communication network (100) may further include a step of sending, from the first base station to each user equipment (105) in the second plurality user equipment, information selected from the group consisting of a higher-layer parameter for a channel and transmission mode, a modulation and coding scheme, cumulative transmit power control command, and a path loss number between user equipment (105) forming the device to device link (140); and enabling said user equipment (105) to use said information to refine the determination of the power control function prior to using the power control function to determine the calculated value. The term "higher-layer parameter" as used herein is a term well known in the art and defined in the specification 3GPP TS 36.213 V12.7.0 (2015-09), Release 12, which is hereby incorporated by reference herein.

Thus, to implement the method, in one embodiment of the invention: a base station apparatus is configured to send power control parameters (1215) to the second plurality of user equipment, the power control parameters (1215) usable in each user equipment (105) in the second plurality user equipment to determine a power control function, $P_D$, and thereafter use the power control function to determine a calculated value of transmit power, the calculated value selected from the group consisting of: a minimum transmit power for reliable data communications of the device to device link (140); and a conventional power control value whose path loss is the path loss to the first base station.

The bsae station apparatus may be configured to further send to a user equipment (105) in the second plurality user equipment, information selected from the group consisting of a higher-layer parameter for a channel and transmission mode, a modulation and coding scheme, cumulative transmit power control command, and a path loss number between user equipment (105) forming the device to device link (140). Said user equipment (105) may use said information to refine the determination of the power control function prior to using the power control function to determine the calculated value of the transmit power.

To implement the method, in another embodiment of the invention: a user equipment is configured to receive power control parameters (1215) from a base station and use the power control parameters (1215) to determine a power control function, $P_D$, and thereafter use the power control function to determine a calculated value of transmit power. The calculated value of transmit power is selected from the group consisting of: the power control function; and a conventional power control value whose path loss is the path loss to the first base station.

The user equipment may be configured to further receive from from a base station information selected from the group consisting of a higher-layer parameter for a channel and transmission mode, a modulation and coding scheme, cumulative transmit power control command, and a path loss number between user equipment (105) forming the device to device link (140). The user equipment (105) may use said information to refine the determination of the power control function prior to using the power control function to determine the calculated value of the transmit power.

In a first example, the transmit power required for reliable data transfer in sidelink communications is determined. PSSCH is the data channel for Device to Device communications (PSSCH is short for physical sidelink control channel), also termed "sidelink communications."

Sidelink transmission mode 1 is also referred to as "Scheduled Resource Allocation" because access to the sidelink resources is driven by the eNodeB and not the user equipment (105).

In mode 1, when the measured transmit power is too low, the base station (210) sends a special command to request an increase in the transmit power. And when the measured power is too strong, the base station (210) sends another command requesting a decrease in the power. This is a means for the transmitter to dynamically change its output power. This kind of power control mechanism is often called "Closed Loop Power Control" and the special command being used for power control is called Transmit Power Control (TPC) command.

For mode 1 and a PSSCH period of i, the user equipment (105) transmit power, $P_{PSSCH}$, when the Transmit Power Control command field in configured sidelink grant for $P_{SSCH}$ period i is set to 1, is given by the following:

$$P_{PSSCH} = \min\begin{Bmatrix} P_{CMAX,PSSCH} \\ 10\log_{10}(M_{PSSCH}) + P_{O\_PSSCH,1} + \alpha_{PSSCH,1} \cdot PL \\ P_D \end{Bmatrix}[dBm]$$

In the above formula, "min" means take the minimum value of the three terms in the parentheses. $M_{PSSCH}$ is the transmission bandwidth of the PSSCH resource assignment expressed in number of resource blocks; PL is the path loss where PL=PLC, where $PL_c$ is the downlink path loss estimate calculated in the user equipment (105) for serving cell "c", in dB; and the conventional power control is $$\min\{P_{CMAX,PSSCH}, 10 \log_{10}(M_{PSCCH}) + P_{O\_PSCCH,1} + \alpha_{PSCCH,1} \cdot PL\}$$

where $P_O{}^{PSSCH,1}$ and $\forall_{PSSCH,1}$ are provided by higher layer parameters p0-r12 and alpha-r12, respectively, and that are associated with the corresponding PSSCH resource configuration.

A second example uses sidelink transmission mode 2. Mode 2 is also referred to as User Equipment Autonomous Resource Selection: In mode 2, the user equipment (105) transmitting Device to Device data does not need to be connected to the eNodeB because the user equipment (105) selects autonomously and randomly the resources within the PSSCH pool to transmit the Sidelink Control Information block. In this second example, the user equipment transmit power $P_{PSSCH}$ is given by $$P_{PSSCH} = \min\begin{cases} P_{CMAX,PSSCH} \\ 10\log_{10}(M_{PSSCH}) + P_{O\_PSSCH,2} + \alpha_{PSSCH,2} \cdot PL \\ P_D \end{cases} [dBm]$$

In this second formula, $P_{CMAX,PSSCH}$ is the maximum UE output power. PSSCH is short for physical sidelink shared channel; $M_{PSSCH}$ is the bandwidth of the PSSCH resource assignment expressed in number of resource blocks; PL is the path loss where PL=PLC, where PLC is the downlink path loss estimate calculated in the user equipment (105) for serving cell "c", in dB. The conventional power value is $$\min\{P_{CMAX,PSSCH}, 10 \log_{10}(M_{PSSCH}) + P_{O\_PSSCH,2} + \alpha_{PSSCH,2} \cdot PL\}$$

where $P_O{}^{PSSCH,2}$ and $\forall_{PSSCH,2}$ are provided by higher layer parameters p0-r12 and alpha-r12, respectively, and that are associated with the corresponding PSSCH resource configuration.

In a third example, the transmit power required for reliable control information transfer in sidelink communications is determined. PSCCH is the control information channel for Device to Device communications, also termed "sidelink communications." For Device to Device communications, using the PSCCH chanel in sidelink transmission mode 1 and a PSCCH period of i, the user equipment transmit power, $P_{PSSCH}$, when the Transmit Power Control command field in configured sidelink grant for $P_{SCCH}$ period i is set to 1, is given by the following:

$$P_{PSCCH} = \min\begin{cases} P_{CMAX,PSCCH} \\ 10\log_{10}(M_{PSCCH}) + P_{O\_PSCCH,1} + \alpha_{PSCCH,1} \cdot PL \\ P_D \end{cases} [dBm]$$

In this third formula, "min" means take the minimum value of the terms in parentheses. $P_{CMAX,PSCCH}$ is the maximum UE power for the control information channel; $M_{PSCCH}=1$; PL=$PL_c$, where $PL_c$ is the downlink path loss estimate calculated for the user equipment (105) for serving cell "C", in dB; and the conventional power value is $$\min\{P_{CMAX,PSCCH}, 10 \log_{10}(M_{PSCCH}) + P_{O\_PSCCH,1} + \alpha_{PSCCH,1} \cdot PL\}$$

In a fourth example using the control information channel for Device to Device communications in sidelink transmission mode 2, the user equipment transmit power, $P_{PSCCH}$, is given by $$P_{PSCCH} = \min\begin{cases} P_{CMAX,PSCCH} \\ 10\log_{10}(M_{PSCCH}) + P_{O\_PSCCH,2} + \alpha_{PSCCH,2} \cdot PL \\ P_D \end{cases} [dBm]$$

In this third formula, $P_{CMAX,PSCCH}$ is the maximum power limit for the transmitter user equipment; $M_{PSCCH}=1$ and PL=$PL_c$ where $PL_c$ is the downlink path loss estimate calculated in the user equipment (105) for serving cell "C" in dB; and the conventional power value is $$\min\{P_{CMAX,PSSCH}, 10 \log_{10}(M_{PSCCH}) + P_{O\_PSSCH,1} + \alpha_{PSCCH,1} \cdot PL\}$$

where, $P_{O\_PSCCH,2}$ and $\forall_{PSCCH,2}$ are provided by higher layer parameters p0-r12 and alpha-r12, respectively, and that are associated with the corresponding PSCCH resource configuration.

In the examples given above, the newly defined power control function, $P_D$, for sidelink communications determines the necessary transmit power for reliable data and control information communications of the sidelink. $P_D$ does not necessarily have the same value in each formula. Seven examples below, designated a.-g., illustrate seven different situations for setting the value of $P_D$:

a. $P_D::=P_D::=\{a_1, a_2, \ldots, a_k\}$ dBm, e.g. $P_D::=\{-30, -29, \ldots 22, 23\}$ dBm, i.e., an integer in decibel-milliwatts (dBm) between $-30$ and $23$. The value to be used is configured by higher layer parameters or preconfigured in the system, e.g. stored in a SIM card;

b. For PSSCH or PSCCH, $$P_D = 10 \log_{10}(M_{D2D}) + P_{O\_D2D} [dBm]$$

Where $M_{D2D}$ denotes the D2D transmission bandwidth in number of PRBs for the corresponding channel, e.g. PSSCH or PSCCH. $P_{O\_D2D}$ is the adjustable power control parameter that is configured by higher layers for the corresponding channel and transmission mode. $P_{O\_D2D}$ may also be preconfigured in the system, e.g. stored in a SIM card.

c. For when the sidelink is experiencing unicast or relay communications between two user equipment in proximity, the power control function, Pp for PSSCH or PSCCH is calculated as, $$P_D = 10 \log_{10}(M_{D2D}) + P_{O\_D2D} + \alpha_{D2D} \cdot PL_s [dBm]$$

$M_{D2D}$ denotes the D2D transmission bandwidth in number of PRBs for the corresponding channel, e.g. PSSCH or PSCCH. $P_{O\_D2D}$ and $\alpha_{D2D}$ are the power control parameters (1215) that are adjustably configured by higher layers for the corresponding channel and transmission mode. $P_{O\_D2D}$ and $\alpha_{D2D}$ may also be preconfigured in the network, e.g., stored in a SIM card. $PL_S$ is the path loss estimate in dB calculated in the user equipment (105) for the link between the two user equipment devices of the sidelink. Thus, the power control parameters (1215) may be configured by higher layers for the corresponding channel and transmission mode or are preconfigured in the the wireless communication network (100).

d. For when the user equipment (105) is in the groupcast or broadcast mode, i.e. one-to-many Proximity-Based Services Direct Communication, the power control function, $P_D$, for PSSCH or PSCCH is given by $$P_D = 10\log_{10}(M_{D2D}) + P_{O\_D2D} + \alpha_{D2D} \cdot PL_M [\text{dBm}]$$

where $PL_M$ is a function of the path loss estimates in dB calculated in the user equipment for the links between a first user equipment and other user equipment in the groupcast or broadcast. For example, assume a first user equipment plus N devices comprising other user equipment in the groupcast mode receiving data from the first user equipment and the path loss estimates from them to the first user equipment are $PL_0, PL_1, \ldots, PL_{N-1}$ respectively. $PL_M$ can be the maximum, minimum, or median, of these path loss estimates.

e. For when a mapping table of the density of active device to device links is used, $P_D$ is a function of the Device to Device Information Element. For example, as illustrated in the following table of enumerated values:

| Density of device to device links (sidelink communications) | $P_D$ |
|---|---|
| 1-3 per cell | 23 dBm |
| 4-7 per cell | 20 dBm |
| Above 7 | 15 dBm | f. For the $P_D$ in examples b.-d., $P_{O\_D2D}$, while provided by higher layer parameters, is determined by the Device to Device Information Element and given in the following table.

| Density of device to device links (sidelink communications) | $P_{O\_D2D}$ |
|---|---|
| 1 per cell | 18 dBm |
| 2 per cell | 15 dBm |
| Above 3 | 12 dBm | g. In this example, $P_D$ is a function of $\Delta_{TF}(i)$, which is determined by the modulation and coding scheme used for the sidelink transmission. For example, $\Delta_{TF}(i)$ is a function of: OCQI, which is the number of Channel Quality Indicator/Pre-coding Matrix Index (CQI/PMI) bits including cyclic redundancy check (CRC) bits; and $N_{RE}$, which is the number of resource elements.

h. In this example, $P_D$ is adjusted based on the accumulative Transmit Power Control commands received from the receiver of the sidelink communications. With the accumulation of Transmit Power Control commands, each Transmit Power Control command signals a power step relative to the previous level of the power control function, $P_D$, for sidelink communications.

Novel Mode Selection

A novel feature of a preferred embodiment disclosed herein is mode selection of a device to device pair. Mode selection is a function of Device to Device Information Element or Device to Base Stations Information Element. Mode selection is determined during device to device pairing by an algorithm that performs calculations based on either the Device to Device Information Element or the Device to Base Stations Information Element. Mode selection determines if the pairing should be in device to device mode or not.

The algorithm for mode selection may be implemented after device to device pairs have discovered each other. One example of the novel mode selection algorithm that can be implemented in Long Term Evolution-A infrastructure is one or several of the following procedures:

1. A pair of Device to Device User Equipment in proximity retrieves Device to Device Information Element or Device to Base Stations Information Element.

2. The device to device pair monitors the downlink reference signals to obtain the channel gain between the nearest access points and the device to device pair itself, which is already supported by existing standards.

3. The device to device pair may estimate the number of active device to device links per unit area, calculate the transmission power, and decide its active status, i.e. whether in device to device mode or not.

4. In a network that allows the device to device link to decide its own communication mode, the device to device pair will communicate in device to device mode if the pair has decided to be in the device to device mode; Otherwise, the device to device pair, either the transmitter or receiver, will notify the serving access point of the pair's suggestion of whether or not the device to device pair should be in device to device mode. After receiving the suggestion, the network may implement a futher calculation and then command the device to device pair to communicate in a certain mode, preferably the mode suggested by the device to device pair itself.

Thus, in a preferred embodiment includes a method utilizable in a wireless communication network (100), the wireless communication network (100) comprising multiple base stations, wherein each base station (210) is able to send and receive communications (110) to another base station in the wireless communication network (100) and to a first plurality of user equipment, wherein a second plurality of user equipment is created by each of said user equipment (105) in the first plurality of user equipment that has formed a pairing with another user equipment, each such pairing defined as a device to device link (140). This includes the steps of: enabling each user equipment (105) in any pairing to retrieve a set of parameters defined as a device to device information element, said device to device information element used to calculate the tolerable mutual interference among potential device to device links; enabling each user equipment (105) in any pairing to retrieve parameters or signalings, named device to device information element 2, that includes statistical information of the active device to device links served by the base station (210) where by the pairing is made; enabling each user equipment (105) in any pairing to monitor downlink reference signals to obtain channel gain between the nearest access points and the device to device pair itself; enabling each user equipment (105) in any pairing to estimate the number of active device to device links per unit area, calculate the transmission power, and decide said user equipment's active status of being in sidelink mode or not; enabling each user equipment (105) in any pairing to communicate in device to device mode if the pairing has decided to be in the device to device mode; enabling each user equipment (105) in any pairing to notify an access point of the pair's suggestion of whether or not the device to device pair should be in device to device mode and after receiving the suggestion; and commanding the device to device pair to communicate in a certain mode, preferably the mode suggested by the device to device pair.

In another exemplary embodiment, the wireless communication network (100), e.g. an access point (Evolved Node B), may perform one or several of the following procedures:

In the wireless communication network (100), each base station (210) keeps track of the density or number of active device to device links in its coverage area, which may be different in different areas or cells, to determine Device to Device Information Element.

If primary users exist, the base station (210) estimates the maximum amount of interference that can be tolerated or the maximum tolerable performance loss, e.g. throughput loss, to determine Device to Base Stations Information Element.

The base station (210) broadcasts the two parameters to all user equipment (105), to device to device pairs, to a specific set of user equipment, or to a specific user equipment.

If and when the network performs the final mode decision for each device to device pair, the network preferably receives the mode suggestion from device to device pairs and then sends a command back to the device to device pair notifying the pair of the result, i.e. its mode decision.

Thus, the above exemplary embodiment, includes a method utilizable in a wireless communication network (100), the wireless communication network (100) comprising multiple base stations, wherein each base station (210) is able to send and receive communications (110) to another base station in the wireless communication network (100) and to a first plurality of user equipment, wherein a second plurality of user equipment is created by each of said user equipment (105) in the first plurality of user equipment that has formed a pairing with another user equipment (105), each such pairing defined as a device to device link, the method comprising the steps of: enabling each base station (210) in the wireless communication network (100) to determine a device to device information element consisting of a set of parameters selected from the group consisting of: density or number of active device to device links; propagation constants related to a channel model; and a coverage area for device to device links; enabling each base station (210) in the wireless communication network (100) to determine a device to base stations information element consisting of a set of parameters selected from the group consisting of: a total amount of interference from the device to device links that is tolerable by the user equipment in an uplink; propagation constants related to a channel model; coverage area for device to device links; and an average sum of channel gain of existing device to device links to the base stations; enabling each base station (210) in the wireless communication network (100) to utilize the device to device information element and the device to base station information element to determine a mode selection result for a device to device paring; and sending the mode selection result to user equipment (105) in the first plurality of user equipment desiring to create the device to device pairing.

For the above exemplary embodiment, the device to base station information element may be a high interference indicator for sidelink communications in the wireless communication network. In addition when the high interference indicatory is present, then the above exemplary embody further includes the step of sending the high interference indicator from a first base station to a second base station with an indication that in the near future, a potential transmission between sidelink communications could be scheduled in certain parts of radio resources.

In one embodiment, the high interference indicator is obtained by adding one bit into the existing High Interference Indicator of Long Term Evolution-A specification and this one bit is used to indicate whether or not the High Interference Indicator is from the sidelink communications.

In another embodiment of the invention, a device to device link (140), base station (210), or the wireless communication network (100), may decide if a device to device pair should be in the device to device mode or not by using the device to device information element or device to base stations information element.

In one example of this embodiment, a potential device to device link may estimate a lower bound and an upper bound of its transmission power for communication in the device to device mode. the lower bound is the minimum amount of transmissoin power needed to meet its own signal-to-interference-plus-noise ratio requirement. An example of the lower bound is $P_D$, as is described above.

The upper bound of the transmission power is the maximum amount of power user equipment may use so that the interference generated to the network, i.e. to the primary UEs and the other device to device links, is tolerable by them. An example of the upper bound is the existing power control, i.e. the conventional power control, for sidelink communications in Long Term Evolution-A in which the path loss is the poss loss for the serving cell.

For other instances, the upper bound can be estimated using a function of the acceptalbe signal-to-interference-plus-noise ratio loss information in device to base stations information element and the density of device to device links in the surrounding area, which is available in the device to device information element.

The lower bound can be estimated using a function of the signal-to-interference-plus-noise ratio requirement of the device to device pair itself, the link gain between its transmitter and receiver, and the density of device to device links in its surrounding area. If the upper bound is higher than the lower bound, the device to device link can be in active device to device communications, i.e. in the device to device mode, otherwise it must not be active.

Novel Inter-Cell Interference Coordination For Proximity Services

A novel feature of a preferred embodiment disclosed herein is a high interference indicator for device to device communications between adjacent base stations. In implementing this feature, a device to device information element 2 is sent from one base station to adjacent base stations to indicate that in the near future, potential transmission between sidelink (device to device) communications will be scheduled in certain parts of the radio resources, e.g. bandwidth, frequency division multiplexing (FDM) symbols, or resource blocks, by the base station.

In another example of implementing this feature, a device to device information element 3 is sent from one user equipment of a device to device pair to adjacent base stations to indicate that in the near future, potential transmission between the sidelink (device to device) communications will be scheduled in certain parts of the radio resources, e.g. bandwidth, frequency division multiplexing (FDM) symbols, or resource blocks, by the device to device pair.

Thus, high interference might occur in those radio resources. However since the interferences would be from sidelink communications, it is likely these interferences would not be as strong as those indicated by the high interference indicator, since sidelink communiations have less priority. So, other Evolved Node Bs would consider it as lower priority and would help in solving the interference issue if there were resources available. In addition, device to device communications may use the least amount of power for transmission. The interference between adjacent cells can be negligible. So, no high interference may exist.

Therefore, in one embodiment of the invention, a user equipment is configured to send a message, named device to device information element 3, that includes load and interference information of device to device communications of the user equipment to a base station of an adjacent cell. This message indicate that in the near future, potential transmission between the sidelink (device to device) communications will be scheduled in certain parts of the radio resources, e.g. bandwidth, frequency division multiplexing (FDM) symbols, or resource blocks, by the device to device pair.

In an exemplary embodiment, one bit is added into the existing high interference indicator, and this one bit is used to indicate whether the high interference indicator is from the sidelink communications or not. One example of the information element for high interference indicator is given in the next paragraph, where the one bit is added to the front of the existing High Interference Indicator.

For a high interference indicator whose presence is marked as mandatory (M), the information element type and reference is: BIT STRING (1, 1 . . . 110, . . . ), the semantics description is: The first bit represents if the high interference indicator is from device to device interferences or not, for which value "1" indicates sidelink communications and "0" otherwise. Each position of the remaining bits in the bitmap represents a PResource Block (second bit=PResource Block 0 and so on), for which value "'1" indicates 'high interference sensitivity' and value "0" indicates 'low interference sensitivity'. The maximum number of Physical Resource Blocks is 110. The last bit represents if the High Interference Indicator is from device to device interferences or not, for which value "1" indicates sidelink communications and "0" otherwise.

In another exemplary embodiment, a dedicated information element is included in the load information in the 3GPP TS 36.423 specification (Evolved Universal Terrestrial Radio Access Network (E-UTRAN); X2 Application Protocol (X2AP)) to indicate the potential high interference from sidelink communications. An example of the load information is given in the tables of FIG. 3A, FIG. 3B, and FIG. 3C, which describes a message sent by an Evolved Node B to neighboring Evolved Node Bs to transfer load and interference co-ordination information. Direction: Evolved Node B1 to Evolved Node B2.

An example of the Uplink High Interference Indication 2 (High Interference Indicator 2) is defined as follows: For Information Element/Group Name: High Interference Indicator 2; having an optional presence; where the Information Element type and reference is: BIT STRING (1 . . . 110, . . . ); and wherein the Semantics description is: Each position in the bitmap represents a Physical Resource Block (first bit=PRB 0 and so on), for which value "'1" indicates 'high interference sensitivity' and value "0" indicates 'low interference sensitivity'; wherein the maximum number of Physical Resource Blocks is 110.

In another exemplary embodiment, the information related to sidelink communications is carried in the load information between Evolved Node Bs. One example is given in the tables of FIG. 4A, FIG. 4B and FIG. 4C, which shows load information, where a new sidelink information is introduced for this purpose. For example, Device to Device Information Element 2 can be carried in the sidelink information. The detailed format of the sidelink information is up to implementation. This message is sent by an Evolved Node B to neighboring Evolved Node Bs to transfer load and interference co-ordination information. Direction: Evolved Node B1 to Evolved Node B2. The message of FIG. 4A, FIG. 4B and FIG. 4C is sent by an Evolved Node B to neighboring Evolved Node Bs to transfer load and interference co-ordination information.

In another embodiment of the invention, a logic interface like X2 is created between a mobile device in the sidelink communications to adjacent base stations or to adjacent devices in sidelink communications. The logic interface is used to send device to device information element 3 of the sidelink communications to adjacent base stations or adjacent sidelinks. Device to device information element 3 may carry load or interference information. A message that can be sent on the logic interface is a high interference indicator for sidelink communications, which is sent from a mobile device in the sidelink communications to adjacent base stations or to adjacent devices in sidelink communications. The high interference indicator is used to inform the adjacent base stations or adjacent devices that in the near future, a potential transmission between sidelink (device to device) communications will be scheduled in certain parts of the radio resources, e.g. bandwidth, frequency division multiplexing symbols, or resource blocks, by the sidelink communications. Thus, high interference might occur in those radio resources.

An example of the high interference indicator is defined as follows: The Information Element/Group Name is: high interference indicator; its presence is mandatory; the information element type and reference is: BIT STRING (1 . . . 110, . . . ); and the semantics description is: Each position in the bitmap represents a PRB (first bit=PRB 0 and so on), for which value "'1" indicates 'high interference sensitivity' and value "0" indicates 'low interference sensitivity'. The maximum number of Physical Resource Blocks is 110.

Thus, an exemplary embodiment includes enabling a base station (210) to retrieve a third set of parameters, named device to device information element 3, from a device to device link in adjacent cells that include load and interference information of the device to device link. The device to device information element 3 is preferably a high interference indicator for the sidelink which sends device to device information element 3 and it a preferred method includes the setp of sending the high interference indicator from a first user equipment in sidelink communications (such user equipment previously referred to as those in the second plurality of user equipment) to a base station (210) with an indication of a potential transmission between user equipment (105) in the sidelink communications that could be scheduled in certain parts of radio resources.

Novel Localization of Mobile Devices in Proximity

Figure 5:
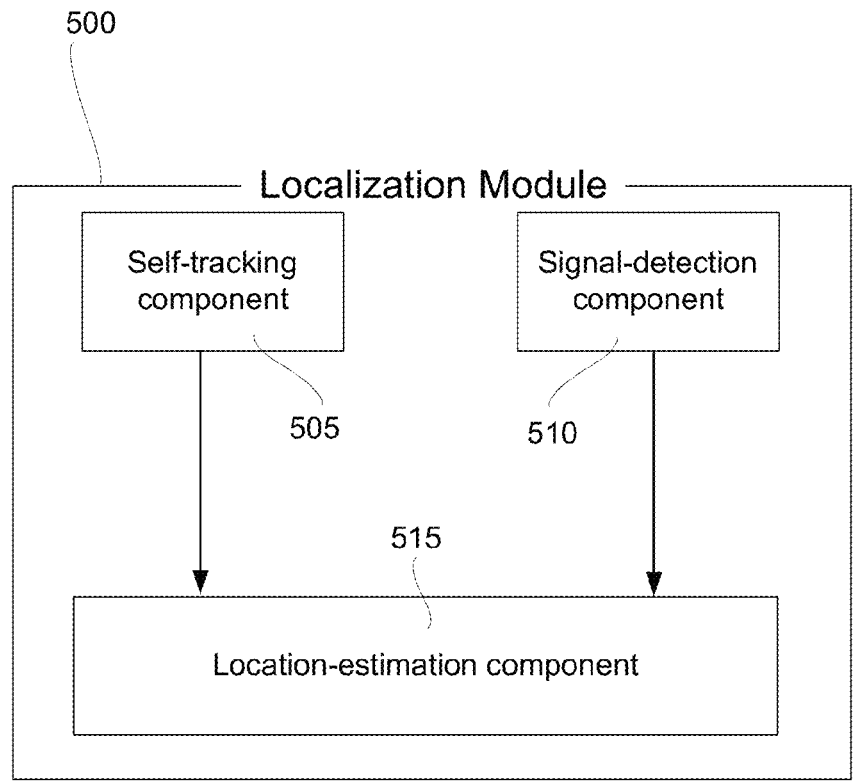
FIG. 5 is a block diagram of a localization module.
Figure 6A:
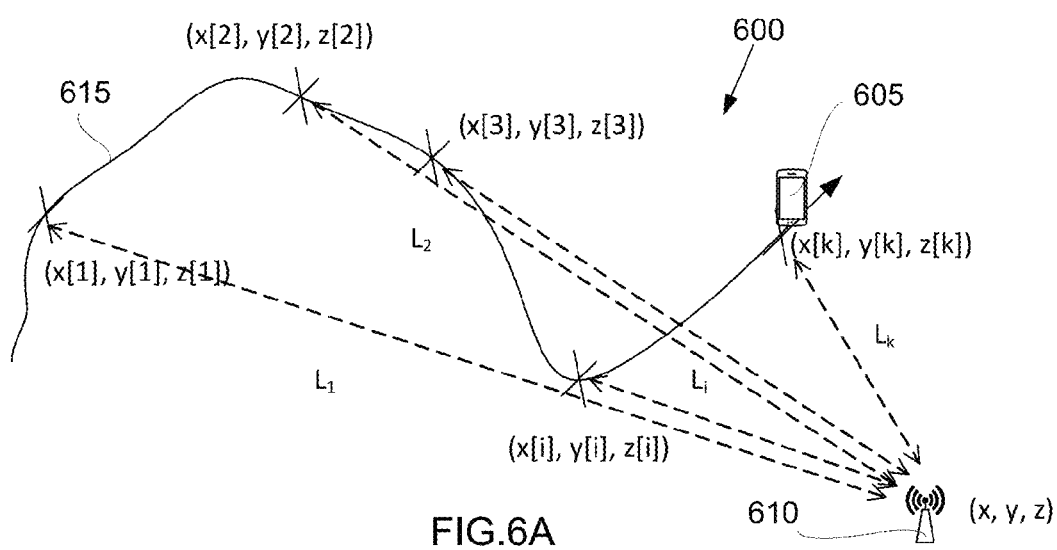
FIG. 6A illustrates a measurement result by a self-tracking component in user equipment.
Figure 6B:
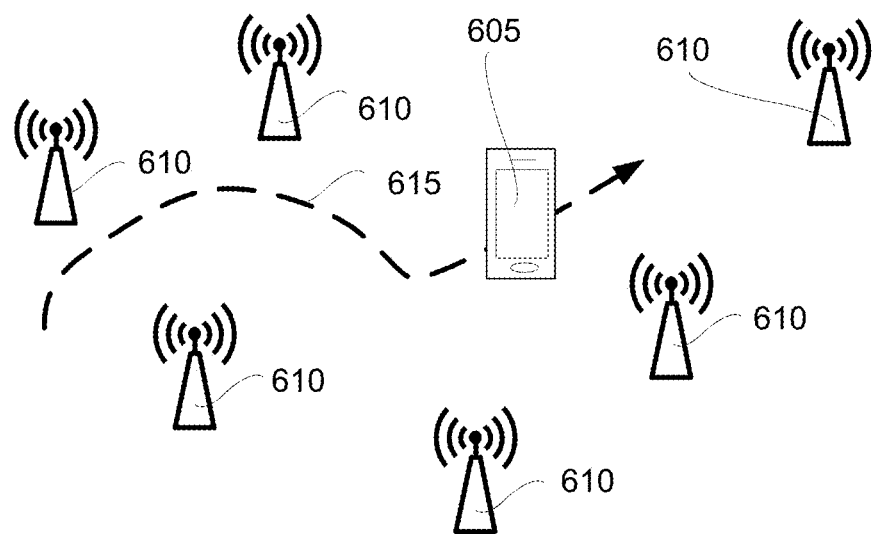
FIG. 6B illustrates implementation of the localization module in a mobile device to locate target transmitters in proximity where the mobile device is not connected to the Internet.

A novel feature of a preferred embodiment disclosed herein is a localization module (500), illustrated in FIG. 5. The localization module (500) is implemented in a mobile device (605) to locate target transmitters in proximity, as illustrated in FIG. 6B and FIG. 7, by the mobile device (605) itself. The mobile device (605) can be for example, a mobile phone, a robot, a car, etc. The target transmitters (610) can be for example, mobile phones, laptops, a book with a radio transmitter, robots, cars, etc. In FIG. 6B, the mobile device is moving on a path (615) in an area where there are multiple target transmitters (610) and the mobile device (605) is not connected to the Internet (125).

The target transmitters (610) are considered to be in proximity as long as their signals can be detected by the mobile device (605).

In FIG. 7, the mobile device is connected (705) to the Internet (125) and a remote sever (710) while moving along a path (615) inside an area where there are multiple target transmitters (610). The target transmitters (610) are considered to be in proximity as long as their signals can be detected by the mobile device (605).

The main function of the localization module (500) is to locate one or several of the target transmitters in proximity to the mobile device itself. In one example of the implementation, the localization module (500) guides the movement of the mobile device (605) continuously so that the mobile device (605) can approach one or more of the target transmitters of interest. With the localization module (500), two mobile terminals in Long Term Evolution networks will be able to approach each other for sidelink communications. In addition, for approaching devices, their throughput can be significantly increased while the energy consumption can be reduced. Meanwhile, approaching devices will also increase the network capacity and enable more simultaneous sidelink communications in Long Term Evolution networks.

The localization module (500) consists of three key components, self-tracking component (505), signal-detection component (510), and location-estimation component (515. Other assisting components may be included. The key functions of the three key components are described below.

The key function of the self-tracking component (505) is to track the movement, i.e. measures or estimates the movement, of the mobile device (605) and report the measurement results to the location-estimation component (515). FIG. 6A illustrates tracking measurements (600) by the self-tracking component (505) in user equipment.

The self-tracking component (505) is configured to perform measurements of location information of the mobile device (605) using sensors. The measured location information is then reported to the location-estimation component (515).

In one example, the self-tracking component (505) in a smart phone, e.g. an IPHONE, can be one that estimates the relative location, moving direction, steps, of the human being carrying the phone, at any sampling time instant by using integrated sensors in the phone, e.g. accelerometer, gyroscope and compass. The path (615) or trace of the mobile device (605) can therefore be tracked by the self-tracking component (505).

If the mobile device (605) were a car, and the self-tracking component (505) were in the car, then the distance the car travels could be measured by counting the number of wheel rotations, and direction of travel could be measured by angle of steering wheel.

If the mobile device (605) were an airplane, and the self-tracking component (505) were in the airplane, then the path (615) of the flight could be traced.

If the mobile device (605) were a robot and the self-tracking component (505) were in the robot, then knowing the robot's step size, i.e. moving distance, and its moving direction, the path (615) could be readily determined.

If the mobile device (605) included a Global Positioning System (GPS) component, then the location of the mobile device (605) could be obtained by reading GPS signals.

Thus, an embodiment of the localization module (500) includes: a self-tracking component (505); a signal-detection component (510); and a location-estimation component (515).

In this embodiment, the self-tracking component (505) comprises sensors to perform measurements of location information of the localization module (500).

In this embodiment, the signal-detection component (510) detects one or more signal properties at locations selected from among those where the self-tracking component (505) performs a measurement for distance information between the localization module (500) and one or more target transmitters (610). See FIG. 6A. The measurements include at least one of: the distance between the localization module (500) and the one or more of the target transmitters (610); and received signal strength of signals received from said one or more target transmitters (610) by the localization module (500). The location-estimation component (515) estimates location information, the location information selected from the group consisting of: geographic coordinates where signal properties were detected by the signal-detection component (510); a localization-related parameter for such geographic coordinates based on the input from the self-tracking component (505) and the signal-detection component (510); and a direction the localization module (500) would have to go to approach said one or more target transmitters (610); and wherein the a self-tracking component (505), the signal-detection component (510) and the location-estimation component (515) are interconnected so as to enable the provision of data to the location-estimation component (515). The sensors are selected from the group consisting of an accelerometer, a gyroscope, a global positioning system that can report its location, and a compass enabling estimation of the relative location and moving direction of the self-tracking component at any sampling time period.

An example of the measurement result by the self-tracking component (505) is illustrated in FIG. 6A: moving direction at the reporting time: $d=(dx, dy, dz)$; and/or relative coordinate: $(x[1], y[1], z[1])$, $(x[2], y[2], z[2])$, $(x[3], y[3], z[3])$, . . . , $(x[k], y[k], z[k])$, which is the relative location of the mobile device itself sampled at k locations on its route. Here $(x, y, z)$ can be a right-handed Cartesian coordinate system, illustrating the x (right-left), y (forward-backward) and z (up-down) axes relative to a human being, a robot, a car, and so on, at the reporting time.

Another example of the measurement result by the self-tracking component (505) is: moving speed at the reporting time: $d=(dx/dt, dy/dt, dz/dt)$; acceleration at the reporting time: $a=(d^2x/dt^2, d^2y/dt^2, d^2z/dt^2)$. The location information may also comprise the time instances that the location information is measured and/or reported.

In the signal-detection component (510), each of the target transmitters (610) is able to broadcast signals that can be detected by the signal-detection component (510). This component detects a set of signal properties at each sampling location for each of the target transmitters (610) of interest and reports this information to the location-estimation component (515). The sampling locations are those where the self-tracking component (505) performs a measurement.

The sampling locations are not necessarily exactly the physical locations at which the self-tracking component (505) performs direct measurements of the physical locations. A direct measurement of the physical location means: when the mobile device (606) is located at $(x[i], y[i], z[i])$, the self-tracking component (505) performs the measurement and obtains the estimates of $(x[i], y[i], z[i])$ itself. The sampling locations may be the physical locations where the self-tracking component (505) performs indirect measurements of the locations. An indirect meansurement of the location means: while the mobile device (606) is located at $(x[i], y[i], z[i])$, the self-tracking component (505) has performed direct measurement of the location information at the physical locations at $(x[1], y[1], z[1])$, . . . , $(x[i−1], y[i−1], z[i−1])$, $(x[i+1], y[i+1], z[i+1])$, . . . $(x[k], y[k], z[k])$, other than $(x[i], y[i], z[i])$. The location information at these locations, $(x[1], y[1], z[1])$, . . . , $(x[i−1], y[i−1], z[i−1])$, (x[i+1], y[i+1], z[i+1]), . . . (x[k], y[k], z[k]), can be used by the self-tracking component (505) or the location estimation component (515) to estimate (x[i], y[i], z[i]). Therefore, the estimate of (x[i], y[i], z[i]) is an indirect estimate as it is based on the direct measurement of the location information at locations other than (x[i], y[i], z[i]) itself. The implementation of the estimate of (x[i], y[i], z[i]) can be performed at the self-tracking component (505), the location estimation component (515), or jointly at both components. In all these cases, we say the sampling locations are those where the self-tracking component (505) performs a measurement, as both the direct and indirct measurements of the sampling locations are based on the location information measured by the self-tracking component (505).

Below, some examples are given relative to one of the target transmitters (610). Simpler examples can be applied to other target transmitters of interest. In the examples, the signal properties that are detected contain information about the distance between the mobile device (605) and one of the target transmitters (610). For example, the signals could be radio signals like Wi-Fi signals, reference signals broadcasted by an Evolved Node B in Long Term Evolution networks, the discovery signals in Device to Device sidelink communications, or dedicated localization signals. These signals may be ultrasonic waves, whose roundtrip traveling time can be used to estimate the distance between the mobile device and target terminal.

Additional examples of the signal properties at the sampling locations are the estimated distance from the target transmitter to the mobile device at the k sampling locations, $\{L[1], L[2], L[3], \ldots, L[k]\}$; the received signal strength indicator, $\{R[1], R[2], R[3], \ldots, R[k]\}$; the time of signal arrival, $\{T[1], T[2], T[3], \ldots, T[k]\}$; multiple received signal strength indicators for several directions in each sampling location: $\{(R[11], d[11]); (R[12], d[12]); \ldots\}, \{(R[21], d[21]); (R[22], d[22]); \ldots\}, \ldots, \{(R[K1], d[K1]); (R[K2], d[K2]); \ldots\}\}$, where R[ij] is the jth received signal strength indicator at the ith location and d[ij] is the corresponding direction measurement of the mobile device.

The location-estimation component (515) estimates the location or any localization-related parameter for each of the target transmitters (610) of interest based on the input from the self-tracking component (505) and the signal-detection component (510). In one example of the implementation, the location of a target transmitter (x, y, z) is estimated by finding the maximum likelihood solution to the following equation group:

$$(x[1]-x)^2+(y[1]-y)^2+(z[1]-z)^2=L[1]^2 ;$$

$$(x[2]-x)^2+(y[2]-y)^2+(z[2]-z)^2=L[2]^2;$$

$$\ldots$$

$$(x[k]-x)^2+(y[k]-y)^2+(z[k]-z)^2=L[k]^2;$$

Or other more advanced estimators can be implemented to estimate the location based on the signal properties provided by the signal-detection component (510) and the input from the self-tracking component (505).

In an exemplary embodiment, the location-estimation component (515) estimates which direction the mobile device (605) would have to go to approach one of the target transmitters (610), that is, (x-x[k], y-y[k], z-z[k]). For example, it may suggest that the mobile device (605) go to the left or right, forward or backward, up or down, so that it will be closer to the target transmitter.

The location-estimation component (515) may perform all the computation of the location estimation locally by the location-estimation component (515) itself. The location-estimation component (515) may further comprise a communications module and offload part or all of the computation of the location estimation to another apparatus either locally or remotely. For example, the location-estimation component (515) may send necessary information based on the input from the self-tracking component (505) and the signal-detection component (510) to a remote server. The remote server performs the estimation of the location or any localization-related parameter for each of the target transmitters (610) of interest and then sends the estimation results back to the location-estimation component (515). In the latter case, it is still the location-estimation component (515) that estimates the location or any localization-related parameter for each of the target transmitters (610) of interest based on the input from the self-tracking component (505) and the signal-detection component (510), as the location-estimation component (515) collects the inputs from the self-tracking component (505) and the signal-detection component (510) and then obtains the estimation of the location or any localization-related parameter for each of the target transmitters (610) of interest.

Therefore in one embodiment of the invention, a location-estimation component (515) comprises an interconnection with a self-tracking component and a signal-detection component. The interconnection enables provision of data from said self-tracking component and said signal-detection component to the location-estimation component. The location-estimation component is capable of estimating location information based on data provided by the self-tracking component and the signal-detection component. The computation of the estimation of the location information can be implemented either locally or remotely. For example the location information can be selected from the group consisting of: geographic coordinates of one or more target transmitters which broadcast signals that can be detected by the signal-detection component; a localization-related parameter for such geographic coordinates; and a direction the location-estimation component would have to go to approach said one or more target transmitters. The self-tracking component may be configured to perform measurements of location information using sensors selected from the group consisting of an accelerometer, a gyroscope, a global positioning system that can report its location, and a compass enabling estimation of a relative location and moving direction of the self-tracking component at any sampling time period.

To implement the location-estimation component, embodiments further provide a non-transitory computer readable memory storing instructions thereon. The instructions when implemented on a computer enable the computer to use data provided by a self-tracking component and a signal-detection component to implement steps of:

estimating location information based on data provided by the self-tracking component and the signal-detection component, the location information selected from the group consisting of: geographic coordinates of one or more target transmitters who broadcast signals that were detected by the signal-detection component; a localization-related parameter for such geographic coordinates; and a direction the self-tracking component would have to go to approach said one or more target transmitters;

wherein the self-tracking component comprises sensors capable of performing measurements of location information of the self-tracking component; and wherein the signal-detection component is capable of detecting one or more signal properties at locations selected from among those where the self-tracking component performs a measurement and the signal properties contain distance information between the signal-detection component and one or more target transmitters.

Proximity System

Figure 8:
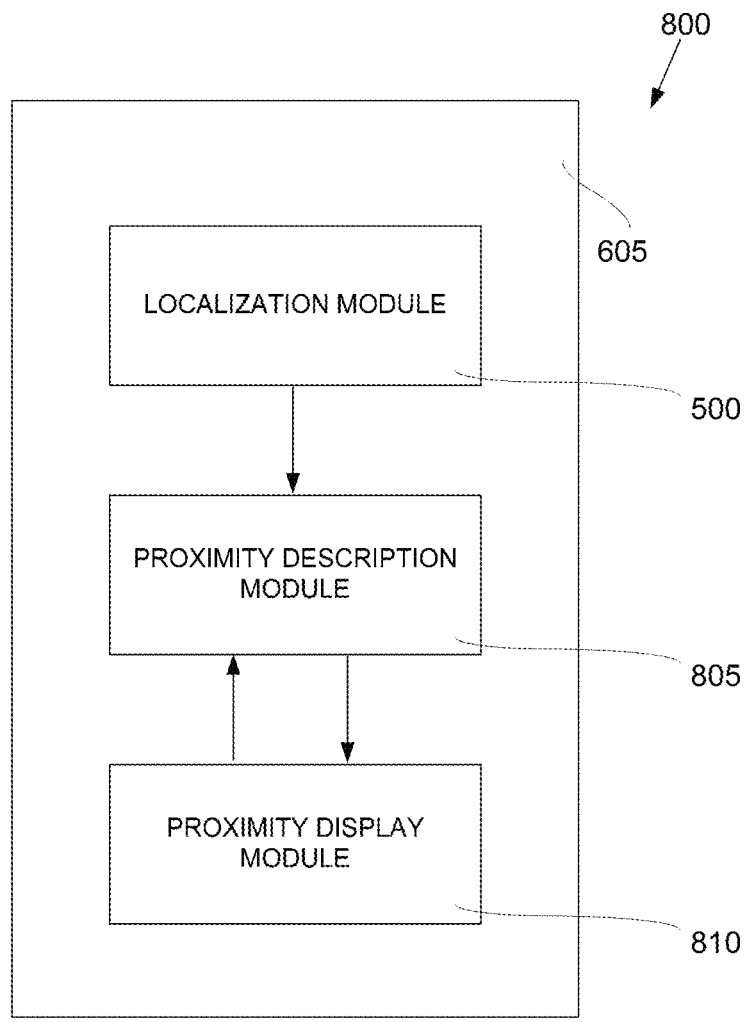
FIG. 8 is a block diagram of a proximity system in a mobile device.

In an exemplary embodiment, a proximity system also referred to as a proximity platform, is illustrated in FIG. 8 and is composed of a localization module (500), a proximity-description module (805) and a proximity-display module (810) within implemented in the mobile device (605).

The proximity platform is used for locating target transmitters (610), also known as wireless transmitters, in proximity to the mobile device (605) and then to display the relevant information about the target transmitters (610) on the mobile device (605). In addition, assisting modules, may be utilized to enhance functionality and add complementary features to the localization module (500), the proximity-description module (805) and the proximity-display module (810).

In this exemplary embodiment, the localization module (500) locates target transmitters (610) in proximity to the mobile device (605) and sends their information, e.g. coordinates and ID, to the proximity-description module (805).

In this exemplary embodiment, the proximity-display module (810) displays the information related to all the target transmitters (610) that have been located by the localization module (500). The way that the information is preferably displayed is dependent on the locations of the target transmitters (610). This information is, for example, the name of the transmitter or of the store where the target transmitter is placed, an advertisement, promotion coupons, video, photos, comments from visitors, price lists, room and floor numbers, etc.

The information related to all the target transmitters (610) may also be the direction and distance information for the mobile device (605) to approach a target transmitter, which has been provided by the localization module (500). In this exemplary embodiment, the way the information is displayed depends on the locations of the target transmitters (610). For example, in a top-down mode, the information of a wireless transmitter that is closer to the mobile device (605) is on top of the one further away, or the other way round.

An embodiment of the proximity-description module (805) is illustrated in FIG. 9. In addition to assisting components, the proximity-description module (805) may include: a storage component (910), which includes non-transitory computer-readable memory, a description component (915); an Internet-access component (920) that provides an optional connection to the Internet (125) so that the proximity-description module (805) may operate in the on-line or off-line mode; and a user-interface component (940). Depending on the availability of Internet access, the proximity-description module (805) is operational in either the online mode (connected to the Internet (125)) or the offline mode (unconnected to the Internet (125)).

In the offline mode, the description component (915) reads from the storage component (910) any information related to the target transmitters (610), also referred to as the wireless transmitters, which have been located. The description component (915) then sends that information for display. In addition, the description component (915) may also get information from the user-interface component (940) and store that information in the storage component (910). For example, a user holding the mobile device (605) may take a picture of a store where a wireless transmitter is located, which is executed by the user-interface component (940), e.g. a camera. The description component (915) will save the picture to the storage component (910).

In the online mode, the switch (930) shown in FIG. 9 is closed establishing the connection enabling the description component (915) to communicate with the one or more remote servers (935). These one or more remote servers (935) may include one or more databases. Such communication enables the mobile device (605) to update the information related to the target transmitters (610) that have been located.

For example, the description component (915) may download information related to the target transmitters (610) from the one or more remote servers (935) and send it to the proximity-display module (810) for display or to the storage component (910) so that it can be synchronized. In addition, the description component (915) may also upload the information that has been stored in the storage component (910) to the one or more remote servers (935). The description component (915) may also get information from the user-interface component (940) and store it in the storage component (910) and/or upload it to the one or more remote servers (935).

Figure 10:
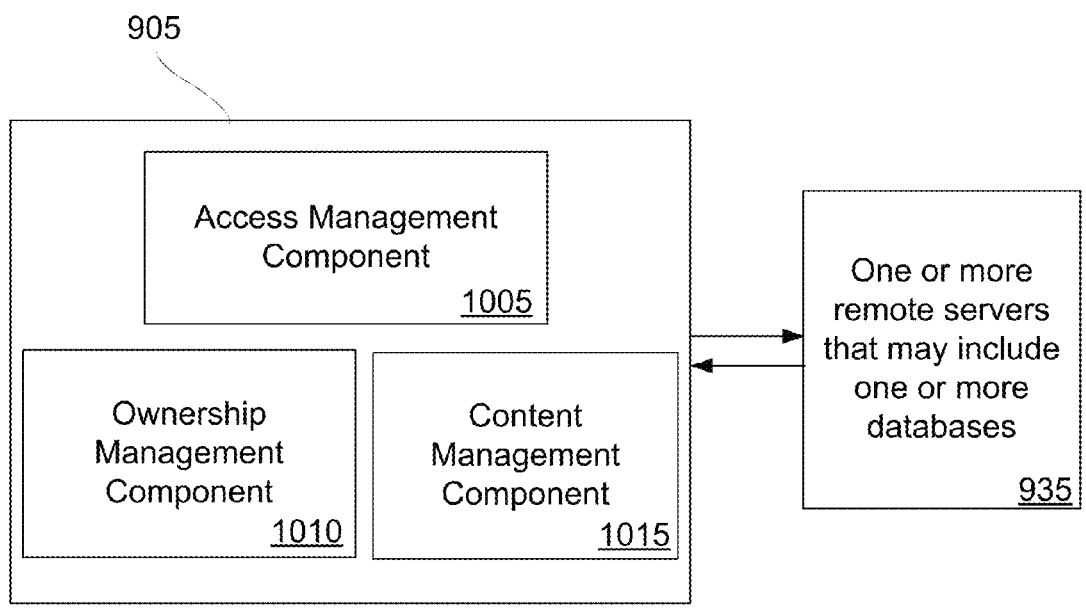
FIG. 10 is a block diagram illustrating functions of the proximity advertisement module.

The proximity platform may also include a proximity advertisement module (905), as illustrated in FIG. 9 and FIG. 10. The proximity advertisement module (905) is an independent module that can be implemented in any device that can access the Internet (125), e.g. a smart phone, an iPad, a laptop, a desktop, etc. The main functions of the proximity advertisement module (905) are illustrated in FIG. 10.

Thus, an embodiment of the proximity system (800) for a wireless communication network (100) includes multiple base stations, wherein each base station (210) is able to send and receive communications (110) in the wireless communication network (100); a plurality of user equipment able to communicate with at least one base station; a plurality of target transmitters that are broadcasting signals, said plurality of target transmitters able to communicate with at least one base station, the proximity system (800) usable to locate one or more target transmitters (610) in the plurality of target transmitters, the proximity system (800) comprising: a localization module (500); a proximity-description module (805); and a proximity-display module (810).

In this embodiment, the localization module (500) locates one or more target transmitters (610) within the plurality of target transmitters and sends proximity information (925) on each located target transmitter to the proximity-description module (805).

In this embodiment, the proximity-description module (805) includes a storage component (910). The storage component (910) includes non-transitory computer readable memory; a description component (915) that reads the proximity information (925) from the storage component (910) and sends the proximity information (925) to the proximity-display module (810) for display; an Internet-access component (920) that provides an optional connection to the Internet; and a user-interface component (940) that inputs user data to the storage component (910), the user-interface component (940) processes the proximity information (925) and sends proximity information (925) to the proximity-display module (810). In this embodiment, the proximity-display module (810) displays the proximity information (925) in a manner that represents the distance from the first user equipment.

In this embodiment, the proximity system may utilize proximity information that is selected from the group consisting of: coordinates of each located target transmitter; an identification of each located target transmitter; a name for each store at each located target transmitter, an advertisement that may be relevant to each located target transmitter, a promotion coupon for any store at each located target transmitter, a video relevant to the area near each located access point, a photo relevant to the area near each located target transmitter, any comments received on the area near each located target transmitter; a price list for products or services available near each located target transmitter; room availability near each located target transmitter; direction and distance information for the first user equipment to approach the target transmitter, and floor numbers of buildings near each located target transmitter.

To implement the proximity system, embodiments further provide a non-transitory computer readable medium storing instructions thereon, the instructions when implemented on a computer enable the computer to receive proximity information of one or more target transmitters within a plurality of target transmitters from a localization module, the instructions further enable the computer to implement steps of:

reading or storing information related to said one or more target transmitters from a storage component that comprises non-transitory computer readable memory;

reading and processing information of said one or more target transmitters using a user-interface component;

downloading or uploading information related to target transmitters from the Internet using an Internet access component;

sending the information of said target transmitters to a proximity-display module for display; and wherein the localization module is capable of estimating the location information of the one or more target transmitters within the a plurality of target transmitters.

The proximity advertisement module (905) includes three main components: an access management component (1005), an ownership management component (1010), and content management component (1015). These three main components may be combined with other assisting components.

The access management component (1005) is used to establish, that is it enables, an Internet connection between the proximity advertisement module (905) and one or more remote servers (935), also referred to as a remote server (710).

The ownership management component (1010) is used to upload material, to wit, information, to one or more remote servers (935), also referred to as a remote server (735). The information is used to verify the ownership of target transmitters (610). For example, a store manager is using the proximity platform and will provide verification information through the ownership management component (1010) to prove that he is the owner of the wireless transmitters, aka, target transmitters (610), deployed in his store.

In one example of a preferred embodiment, ownership of the target transmitters (610) is verified by uploading the MAC address, SSID, or a picture of the bar code on the target transmitter to the one or more remote servers (935) using the ownership management component (1010). In one example of a preferred embodiment, ownership of the target transmitters (610) is verified by uploading information related to the purchasing receipt for the target transmitters (610) to the one or more remote servers (935) using the ownership management component (1010). After a wireless transmitter is verified, the information related to this wireless transmitter is managed or administered through the content management component (1015) by its owner.

The content management component (1015) is used by the owner to manage the information related to the target transmitters (610) that are verified to the one or more remote servers (935). For example, a geolocation of any of the target transmitters (610) can be uploaded to the one or more remote servers (935) by the owner using the content management component (1015). The floorplan of the building where each of the target transmitters (610) is located can be uploaded to the one or more remote servers (935) by the owner using the content management component (1015). Store description, sales promotion, advertisement, price list, and so on of the store that owns the target transmitter (610) can be uploaded to the one or more remote servers (935) by the owner using the content management component (1015). The same information, e.g. promotion advertisement and price list, may be uploaded for a group of verified wireless transmitters to the one or more remote servers (935) by the owner.

To implement the proximity advertisement module (905), a non-transitory computer readable medium may store instructions thereon, and the instructions enable the computer to implement steps of:

using an Internet connection between said computer and one or more remote servers to upload material of a target transmitter in the plurality of target transmitters to said one or more remote servers; and manage the proximity information of each verified target transmitter to the said one or more remote servers, wherein said material can be used to verify ownership of a target transmitter in the plurality of target transmitters that once verified becomes a verified target transmitter;

An Implementation Example

A detailed implementation example of the invented interference coordination technollogies.

Define $\varphi xk \in \{0, 1\}, \forall x \in \{1, \ldots, N\} \forall k \in \{1, \ldots, N\hat{}x\}$, as a binary random variable that indicates the state of a Device to Device link. For $\varphi xk=1$ the Device to Device link k in cell x is active, i.e. in the device to device mode, otherwise $\varphi xk=0$. The parameter N corresponds to the number of cells in the system and $N\hat{}x$ is the number of available device to device links in cell x.

The maximum level of interference that can be tolerated in the system is given by the Signal-to-Interference-plus-Noise Ratio requirements for the Cellular User Equipment and device to device links, depicted in (2.1a) and (2.1b), respectively. An upper bound for the transmission power of device to device links shown in (2.1c).

$$\Gamma_{x0} = \frac{P_{x0} G_{x0x0}}{I_{x0}^{D2D} + I_{x0}^{CUE} + N_{BS}} \geq \gamma_{x0}^{th}, \quad (2.1a)$$

$$\Gamma_{xk} = \frac{\phi_{xk} P_{xk} G_{xkxk}}{I_{xk}^{D2D} + I_{xk}^{CUE} + N_D} \geq \gamma_{xk}^{th}, \quad (2.1b)$$

$$\phi_{xk} P_{xk} \leq P_D^{max}, \quad (2.1c)$$

$$\forall x \in \{1, \ldots, N\} \, \forall k \in \{1, \ldots, \hat{N}_x\}.$$

The terms $I^{D2D}$ and $I^{CUE}$ correspond to the interference received at the base stations x0 and x0 of cell x, from the device to device links and Cellular User Equipment, respectively. Similarly $I_{xk}^{D2D}$ and $I_{xk}^{CUE}$ correspond to the interference received at the Device to Device link k of cell x from other device to device links and Cellular User Equipment, respectively. $N_{BS}$ and $N_D$ are the noise power at the base stations and device to device links receivers respectively. $P_{x0}$ corresponds to the transmission power from the Cellular User Equipment at cell x. $P_{xk}$ is the power of the transmitting device of device to device pair k in cell x and P max is the maximum transmission power of device to device links. $\gamma_{x0}^{th}$ and $\gamma_{xk}^{th}$ represent the target Signal-to-Interference-plus-Noise Ratio of the Cellular User Equipment uplink and the Device to Device link k in cell x, respectively.

The term G is the channel gain and has a subscript formed using a general rule. For example the general rule is that a subscript "abij" in $G_{abij}$ corresponds to the channel gain from the transmitter "b" in cell "a" to the receiver "j" in cell "i". Note that in all variables, cellular user equipment and base stations are indexed as "0" and Device to Device users are indexed with integer numbers greater than zero. In equations (2.1a) and (2.1b), $G_{x0x0}$ corresponds to the channel gain between the Cellular User Equipment and the base stations of cell x, while $G_{xkxk}$ corresponds to the channel gain between the transmitter and receiver of device to device pair k in cell x.

Thus, the interference terms are defined as:

$$I_{x0}^{D2D} = \sum_{i=1}^{N} \sum_{j=1}^{N_i} \phi_{ij} P_{ij} G_{ijx0}, \qquad (2.1a)$$

$$I_{x0}^{CUE} = \sum_{\substack{i=1 \\ i \neq x}}^{N} P_{i0} G_{i0x0}, \qquad (2.1b)$$

$$I_{xk}^{D2D} = \sum_{i=1}^{N} \sum_{j=1}^{\hat{N}_i} \phi_{ij} P_{ij} G_{ijxk} - \phi_{xk} P_{xk} G_{xkxk}, \qquad (2.1c)$$

$$I_{xk}^{CUE} = \sum_{i=1}^{N} P_{i0} G_{i0xk}, \qquad (2.1d)$$

$$\forall x \in \{1, \dots, N\} \; \forall k \in \{1, \dots, \hat{N}_x\}.$$

From equations (2.1a) and (2.1b), there are two levels of interference in the network. The Signal-to-Interference-plus-Noise Ratio target for cellular user equipment (CUE) is redefined as:

$$\gamma_{x0}^{th} = \frac{\Gamma_{x0}^i}{\delta} = \frac{P_{x0} G_{x0x0}}{(I_{x0}^{CUE} + N_{BS})\delta}, \; \forall \delta \in \{\mathbb{R}^+; \delta > 1\}, \qquad (2.3)$$

where $\Gamma_{x0}^i$ is the average Signal-to-Interference-plus-Noise Ratio of Cellular User Equipment before device to device links are added to the system. The parameter $\delta$ corresponds to the desired ratio between the Cellular User Equipment's Signal-to-Interference-plus-Noise Ratio before and after device to device links are added, i.e., the Signal-to-Interference-plus-Noise Ratio loss of Cellular User Equipment due to device to device links and this parameter is carried in the newly created Device to Base Stations Information Element.

This definition allows a clear evaluation of the impact of device to device links to the Cellular User Equipment uplink, thus the Quality of Service (QoS) of Cellular User Equipment is defined as the Signal-to-Interference-plus-Noise Ratio loss being below the desired target $\delta$th. For the device to device links, the Quality of Service is defined as the Signal-to-Interference-plus-Noise Ratio being above a given threshold $\gamma$th xk. The target Signal-to-Interference-plus-Noise Ratio for device to device links is $\gamma^{th}_{xk} = \gamma_D$.

Consider a victim receiver v surrounded by N devices. The aggregated interference, I, received at v as:

$$I_v = \sum_{i=1}^{\tilde{N}} P_{txvi} G_{vi}^I, \qquad (2.4)$$

where $P_{txvi}$ is the transmission power of an interfering device i and $G_{vi}^I$ is the channel gain between v and i.

Assume that interfering devices are randomly distributed within a given area A. Thus the channel gains can be represented as a random variable $G_{vi}$. It is also assumed that the interfering devices have the same transmission power $P_{txvi} = P_{tx} \leq P_{max}$, where $P_{max}$ is the maximum transmission power allowed by regulatory entities or the power amplifier. The expected value for the aggregated interference within A is:

$$\mathbb{E}[I_v] = \tilde{N}_A A P_{tx} \mathbb{E}[G_{vi}], \qquad (2.5)$$

where A $\Psi_A$ is the number of interfering devices per unit area, and can be derived by using Device to Device Information Element.

Define $A = \pi(dw)^2$ as a circular interference area around v where dw is the maximum distance between v and an interfering device. Notice that the interference caused by devices outside of A is negligible compared to interference caused by the users inside due to the path loss attenuation. For example, $d_w$ can be defined as:

$$P_{max} \mathbb{E}[G_{vw}] < \mathcal{N}_v, \qquad (2.6)$$

$$d_{vw} > \left( \frac{P_{max} c_v \mathbb{E}[|h_{vw}|^2]}{\mathcal{N}_v} \right)^{1/\alpha_v} = d_w,$$

where $N_v$ is the noise power at the victim receiver and $d_{vi}$ is the distance between devices v and i. The channel gain between v and i as:

$$G_{vi} = c_v d_{vi}^{-\alpha_v} |h_{vi}|^2, \qquad (2.7)$$

where $c_v$ refers to a propagation constant and $\alpha_v$ is the path loss exponent. The effects of fading are represented by $|h_{vi}|^2$. This metric means the interference out of the circular area is weaker than thermal noise.

The expected value of $G_{vi}$ is:

$$\mathbb{E}[G_{vi}] = c_v \mathbb{E}[d_{vi}^{-\alpha_v}] \mathbb{E}[|h_{vi}|^2]. \qquad (2.8)$$

It is assumed that device v to be located at a fixed point and device i to be positioned randomly following a circular distribution around v. Thus, the probability density function of $d_{vi}$ is given by a triangular distribution depicted as:

$$f_{d_{vi}}(x) = \begin{cases} \frac{2x}{(d_{max})^2} & \text{if } d_{min} \leq x \leq d_{max}, \\ 0 & \text{otherwise.} \end{cases} \qquad (2.9)$$

Combining (2.8) and (2.9) we have that $\forall \alpha v \in \{\mathbb{R}+; \alpha v > 2\}$.

$$\mathbb{E}[G_{vi}] = c_v \mathbb{E}[|h_{vi}|^2] \int_{d_{min}}^{d_{max}} x^{-\alpha_v} f_{d_{vi}}(x) dx \quad (2.10)$$

$$= c_v \mathbb{E}[|h_{vi}|^2] \int_{d_{min}}^{d_{max}} \frac{2x^{(1-\alpha_v)}}{(d_{max})^2} dx$$

$$= \frac{2c_v \mathbb{E}[|h_{vi}|^2](d_{min}^{-(\alpha_v-2)} - d_{max}^{-(\alpha_v-2)})}{(d_{max})^2(\alpha_v - 2)}.$$

Assume the channel to be invariant during the period of interest, thus it is assumes that $E[|h_{vi}|^2]=1$. Note also that for practical applications, the probability density function of $d_{vi}$ can be changed to match real users distribution. Then, the expected interference to a victim in an area using (2.5), which is a generic formula and can be used to determine the mode selection procedures.

Consider a device to device pair k in a cell x, denoted by $D2D_{xk}$, that needs to decide its operating mode, i.e. Device to Device or cellular mode. Define the upper and lower bound for the transmission power as $P_{D_{xk}}^{UB}$ and $P_{D_{xk}}^{LB}$, respectively.

To obtain the upper bound first, the term $I_{x0}^{D2D}$ found in (2.2a), is defined as:

$$I_{x0}^{D2D} = \varphi_{xk} P_{xk} G_{xkx0} + \hat{I}_{x0}^{D2D} = \varphi_{xk} P_{D_{xk}} G_{xkx0} + \hat{I}_{x0}^{D2D}, \quad (3.12)$$

where $\hat{I}_{x0}^{D2D}$ corresponds to the aggregated interference caused by active Device to Device links to the base stations of cell x ($BS_{sx}$). Since $D2D_{xk}$ does not have Channel State Information (CSI) to calculate $\hat{I}_{x0}^{D2D}$, it is considered to be a random variable, thus its expected value is calculated by applying the interference model presented above.

As a result, the equation is:

$$\mathbb{E}[\hat{I}_{x0}^{D2D}] = \frac{\tilde{N}_x}{A_{cl_x}} A_{x0} P_{D_{xk}} \mathbb{E}[G_{D2D-BS}], \quad (3.13)$$

where $A_{x0}$ is the interference area and $A_{cl_x}$ is the area of cell x. The term $E[G_{D2D-BS}]$ is the expected value of the channel gain between active device to device links and base stations.

The statistical upper bound for the transmission power of device to device links $P_{D_{xk}}^{UB}$ by combining the expected value of (2.1a) and (2.1c) with (3.13), thus $P_{D_{xk}}^{UB}$ is given by:

$$P_{D_{xk}}^{UB} = \min\left\{\frac{\hat{I}_{x0}^{th}}{G_{xkx0} + \frac{\tilde{N}_x}{A_{cl_x}} A_{x0} \mathbb{E}[G_{D2D-BS}]}, P_D^{max}\right\}, \quad (3.14)$$

$$\hat{I}_{x0}^{th} = (I_{x0}^{th} - \mathbb{E}[I_{x0}^{CUE}] - N_{BS}),$$

$$\cdot x \in \{1, \ldots, N\} \forall k \in \{1, \ldots, \hat{N}_x\}.$$

where $G_{xkx0}$ corresponds to the instantaneous channel gain between $D2D_{xk}$ and $BS_{sx}$, which can be estimated using the downlink reference signals.

The term $I_{x0}^{CUE}$ is considered to be a random variable and can be estimated by applying the interference model presented in the above. The parameter $\hat{I}_{x0}^{th}$, is the total amount of interference that the device to device links cause to the base stations x so that the Quality of Service of the Cellular User Equipment can be assured.

$\hat{I}_{x0}^{th}$ may be carried in Device to Device Information Element.

To obtain the lower bound for the transmission power, the Signal-to-Interference-plus-Noise Ratio requirement of device to device links in (2.1b), where the term $I_{xk}^{D2D}$ represents the interference from other active device to device links to $D2D_{xk}$ and can be estimated as:

$$\mathbb{E}[I_{xk}^{D2D}] = \frac{N_{xd}}{A_{dx}} A_{xk} P_D \mathbb{E}[G_{D2D-I}].$$

Here the parameter Axk is the interference area and $E[G_{D2D-I}]$ is the expected value of the channel gain between an interfering Device to Device link (within Axk) and $D2D_{xk}$.

Figure 11:
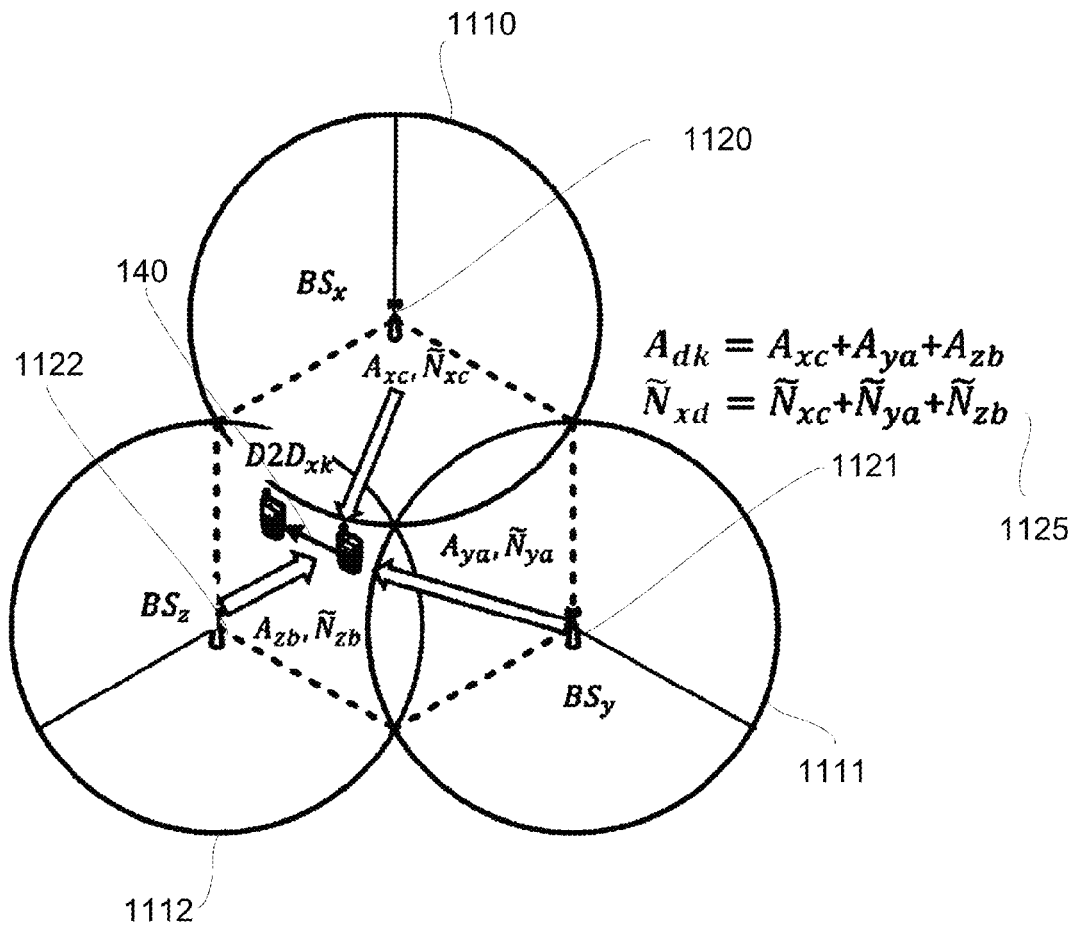
FIG. 11 illustrates a means for estimating the number of active device to device links per unit area.

To estimate the number of active device to device links per unit area in the surrounding area of $D2D_{xk}$ we assume that the cells are divided into three sectors (1110), (1111) and (1112), which is highly common in practical applications like Long Term Evolution-A, as illustrated in FIG. 11.

Thus, base station x, $BS_x$ (1120), $BS_y$ (1121), and $BS_z$ (1122), can know the number of active device to device links on each sector and this could be broadcasted to the users using Device to Device Information Element and exchanged among base stations using Device to Device Information Element 2. Nxd in the calculation (1125) represents the sum of active device to device links in the three sectors (1110), (1111) and (1112) that are closer to D2Dxk and Adk is the area enclosed by such sectors.

By calculating the expected value of (2.1b) and combining it with (3.16), a statistical lower bound for the transmission power of device to device links is obtained as follows:

$$P_{D_{xk}}^{LB} = \frac{(\mathbb{E}[I_{xk}^{CUE}] + N_D) A_{dk} \gamma_D}{G_{xkxk} A_{dx} - \left(\gamma_D \frac{\tilde{N}_{xd}}{A_{dk}} A_{xk} \mathbb{E}[G_{D2D-I}]\right)}, \quad (3.17)$$

$$\forall x \in \{1, \ldots, N\} \forall k \in \{1, \ldots, \hat{N}_x\}.$$

The term $G_{xkxk}$ corresponds to the channel gain between the transmitter and receiver of $D2D_{xk}$ which is obtained from the discovery procedure. The parameter $I_{xk}^{CUE}$ corresponds to the interference caused by Cellular User Equipment towards D2Dxk and can be estimated locally.

Finally the mode selection of Device to Device xk is given by:

$$\phi_{xk} = \begin{cases} 1 \text{ if } P_{D_{xk}}^{LB} \leq P_{D_{xk}}^{UB} \\ 0 \text{ if } P_{D_{xk}}^{LB} > P_{D_{xk}}^{UB} \end{cases}, \quad (3.18a)$$

$$P_{xk} = \phi_{xk} P_{D_{xk}}^{LB}, \quad (3.18b)$$

$$\forall x \in \{1, \ldots, N\} \forall k \in \{1, \ldots, \hat{N}_x\}.$$

The transmission power can also use other formulas to determine, for example, 3GPP Long Term Evolution-A closed-loop power control.

In this implementation each of the base stations needs to broadcast a limited number of parameters using Device to Device Information Element or Device to Base Stations Information Element that are common to all device to device links. The base stations may also exchange Device to Device Information Element 2.

Below are several examples of the information that may be carried in Device to Device Information Element or Device to Base Stations Information Element in the implementation.

1. Density or number of active device to device links in each cell or sector. This information can be carried in Device to Device Information Element.

2.

$$I_{x0}^{th}=(I_{x0}^{th}-\mathbb{E}[I_{x0}^{CUE}]-N_{BS}),$$

the total amount of interference from the device to device links that is tolerable by the Cellular User Equipment uplink of a cell. It can be carried in Device to Base Stations Information Element.

3. c0, cd, α0, αd : propagation constants related to the channel model. They can be carried in either Device to Device Information Element or Device to Base Stations Information Element.

4. Area of each cell or sector. This can be carried in Device to Base Stations Information Element or Device to Device Information Element.

5. Average sum channel gain of existing device to device links to the base stations:

$$\frac{\tilde{N}_x}{A_{cl_x}}A_{x0}\mathbb{E}[G_{D2D-BS}]$$

this can be carried in Device to Base Stations Information Element, as this information can be used to determine the amount of interference generated from device to device links to the primary users.

Figure 12:
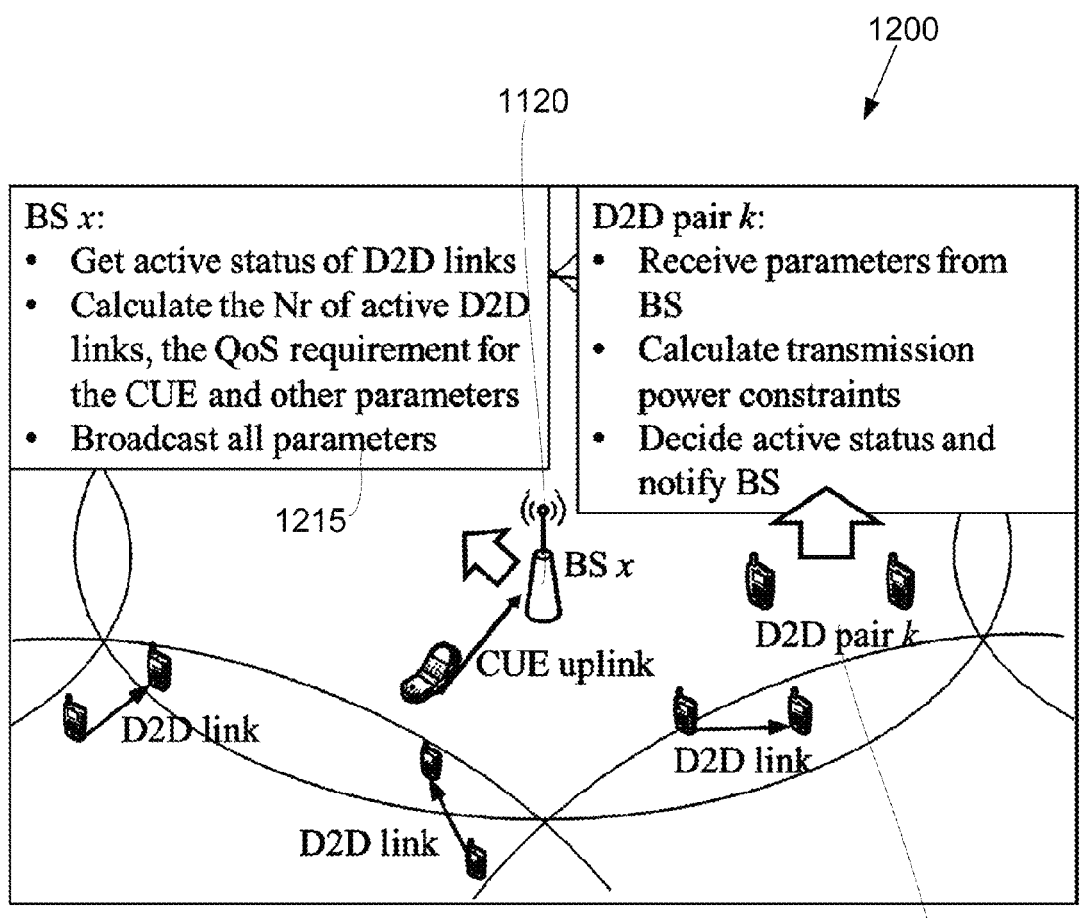
FIG. 12 illustrates an example role of the implementation of the novel signal steps and procedures between a device to device pair and its serving base stations.

FIG. 12 illustrates an example role of the implementation (1200) of the novel signal steps and procedures between a device to device pair and its serving Base Stations. The procedures performed by base station x (1120) and a D2D pair k (1210) within the implementation. The base station x (1205) (BS x) keeps track of the number ($N_r$) of active device to device links, calculates the amount of interference that the Cellular User Equipment uplink can tolerate, $\hat{I}_{x0}^{th}$, and broadcasts these and other necessary parameters so that the device to device links can determine their modes.

Figure 13:
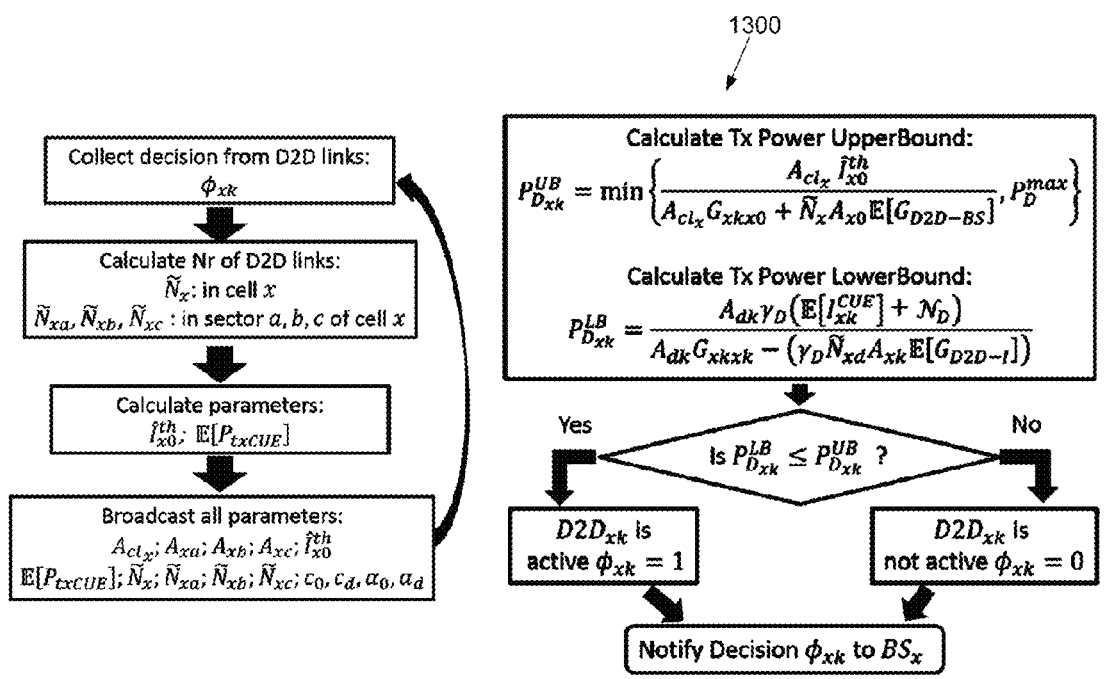
FIG. 13 is a pictorial representation of the signaling flow of an embodiment of the invention with the flow for base stations shown on the left and the flow for device to device pairings shown on the right.

At the same time the device to device pairs receive the parameters broadcast by base station x (1120) (also referred to as BSx), calculate the upper bounds and lower bounds for their transmission power and notify base station x (1120) of the mode suggestion. A pictorial representation of the signaling flow (1300) of the above described implementation of the invention (Left: base stations, Right: Device to Device) is illustrated in FIG. 13.

Figure 14:
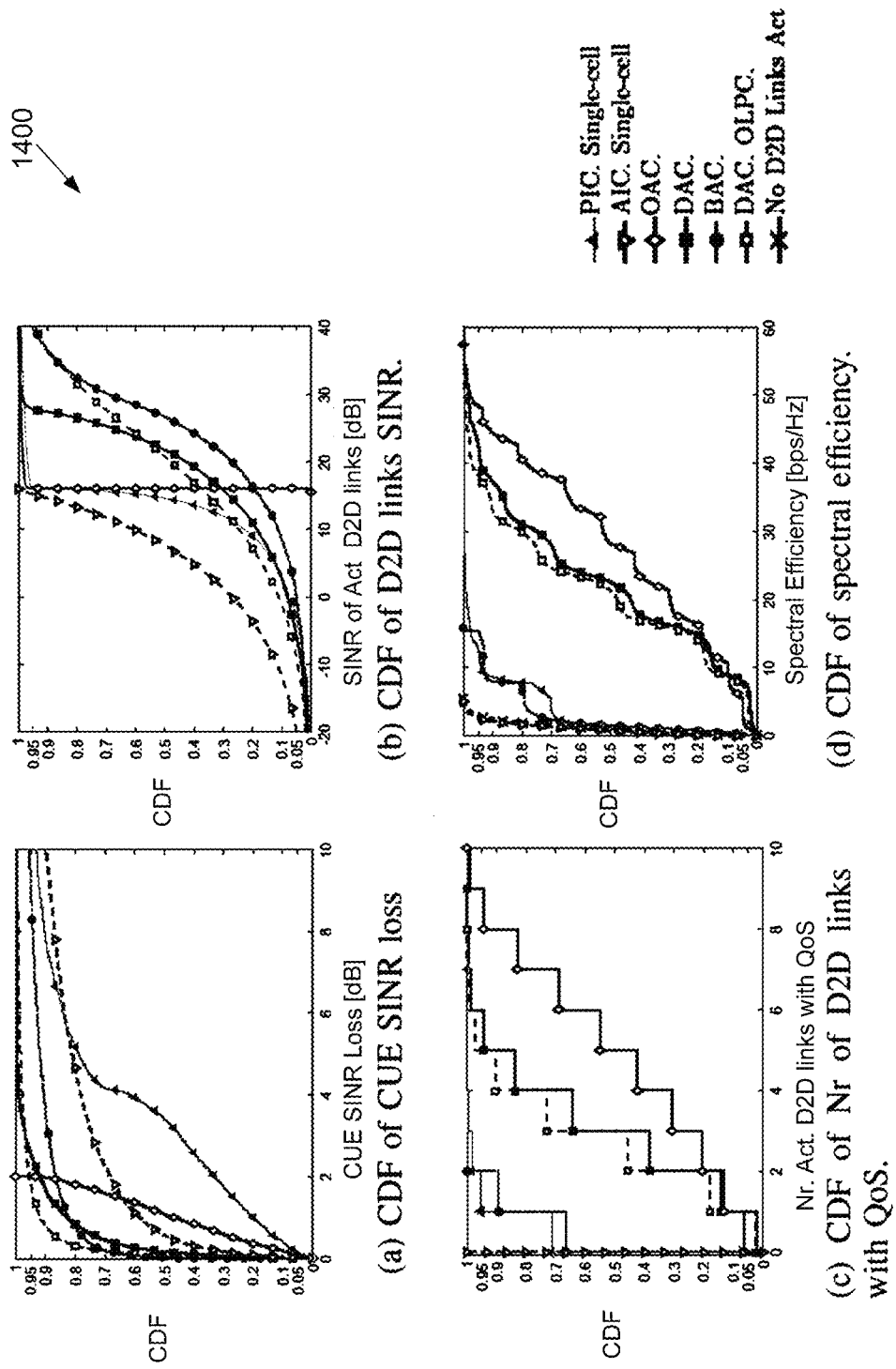
FIG. 14 illustrates simulation parameters and performance of the implementation in a multi-cell cellular network.

FIG. 14 graphically illustrates the simulation parameters and performance (1400) of the implementation in a multi-cell cellular network. It shows a charging data function (CDF) of overall performance for D2D signal to interference plus noise ratio γD=16 dB, the tolerable signal to interference plus noise ratio of cellular UEδ=2 dB. The simulation parameters used are as follows: Radius=R=400 meters; Noise power=−174 dBm/Hz; Resource Block Bandwidth: Bw=180 kHz; Carrier Frequency=fc=2 GHz=2 gigaHertz; Maximum transmission power=Pmax=23 dBm; Minimum distance between the base stations and the UEs=dmin=10 meters; Device to Device distance (dD2D) limits are: Dmin=10 meters; and Dmax=40 meters; Number of cells=N=7; Path loss coefficient (UE to base stations)=CO=−30.55 dB; Path loss coefficient (UE to UE)=cd=−28.03 dB; Path loss experienced (user to base stations)=∀0=3.67; Path loss experienced (UE to UE)=∀d=4.

The above implementation in a multi-cell cellular network illustrated in FIG. 14 follows Long Term Evolution-A standardization. In each graph of FIG. 14, the Distributed Admission Control (DAC) is the implementation example of the invented approach. Distributed Admission Control, Open Loop Power Control (DAC, OLPC) is the approach using Distributed Admission Control as the mode selection algorithm while the Long Term Evolution-A open loop power control is applied for determining the transmission power of device to device pairs.

SINR is the signal-to-interference-plus-noise ratio. CDF is the cumulative distribution.

Optimal admission control (OAC) is the globally optimal algorithm that assumes full channel state information in a central scheduler who can schedule the transmission of all devices. This serves as the performance upper bound for Device to Device systems and can never be implemented in practice.

Blind admission control (BAC) is the blind mode selection algorithm where device to device pairs are randomly chosen to be in device to device mode. Thus, the example shows that a significant throughput improvement results from using the invented approach, while having negligible performance impact on the primary UE.

Certain embodiments of the present disclosure are described above with reference to block and flow diagrams of systems and methods and/or computer program products according to example embodiments of the present disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the present disclosure.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the present disclosure may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of the present disclosure have been described in connection with what is presently considered to be the most practical and various embodiments, it is to be understood that the present disclosure is not to be limited to the disclosed embodiments, but is intended to cover various modifications and equivalent arrangements included within the scope of the appended claims. Although specific terms are employed herein, they are used in a generic and descriptive sense only and not for purposes of limitation.

This written description uses examples to disclose certain embodiments of the present disclosure, including the best mode, and also to enable any person skilled in the art to practice certain embodiments of the present disclosure, including making and using any devices or systems and performing any incorporated methods. The patentable scope of certain embodiments of the present disclosure is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The article 19 amendments of parent application PCT/US2015/058819 as submitted on Mar. 14, 2016 (and published on Jun. 2, 2016) with statement of support on the original application PCT/US2015/058819 are incorporated herein by reference in their entirety.

INDUSTRIAL APPLICABILITY

The invention has application at least to the information and communication technology industry.

What is claimed is:

1. A location-estimation component comprising:
an interconnection with a self-tracking component and a signal-detection component, the interconnection enabling provision of data to the location-estimation component, the location-estimation component capable of estimating location information based on data provided by the self-tracking component and the signal-detection-component, the location information selected from the group consisting of: geographic coordinates of one or more target transmitters which broadcast signals that can be detected by the signal-detection component; a localization-related parameter for such geographic coordinates; and a direction the location-estimation component would have to go to approach said one or more target transmitters;
wherein the self-tracking component comprises sensors configured to perform measurements of location information of the location-estimation component; and wherein the signal-detection component is configured to detect one or more signal properties at locations selected from among those where the self-tracking component performs a measurement and the signal properties contain distance information between the location-estimation component and said one or more target transmitters.

2. The location-estimation component of claim 1, wherein the self-tracking component is configured to perform measurements of location information using sensors selected from the group consisting of an accelerometer, a gyroscope, a global positioning system that can report its location, and a compass enabling estimation of a relative location and moving direction of the self-tracking component at any sampling time period.

3. A non-transitory computer readable medium storing instructions thereon, said instructions comprising:
instructions when implemented on a computer enable the computer to receive proximity information of one or more target transmitters within a plurality of target transmitters from a localization module, the instructions further enable the computer to implement steps of:
reading or storing information related to said one or more target transmitters from a storage component that comprises non-transitory computer readable memory;
reading and processing information of said one or more target transmitters using a user-interface component;
downloading or uploading information related to target transmitters from the Internet using an optional Internet access component;
sending the information of said target transmitters to a proximity-display module for display; and
wherein the localization module is capable of estimating location information of the one or more target transmitters within the a plurality of target transmitters and comprises a self-tracking component, a signal-detection component, and a location-estimation component;
wherein the location-estimation component is configured to estimate location information based on data provided by the self-tracking component and the signal-detection component, the location information selected from the group consisting of: geographic coordinates of said one or more target transmitters who broadcast signals that were detected by the signal-detection component; a localization-related parameter for such geographic coordinates; and a direction the localization module would have to go to approach said one or more target transmitters; and
wherein the self-tracking component, the signal-detection component and the location-estimation component are interconnected so as to enable provision of data to the location-estimation component.

4. The non-transitory computer readable medium of claim 3, wherein the proximity information is selected from the group consisting of: coordinates of each located target transmitter; an identification of each located target transmitter; a name for each store at each located target transmitter, an advertisement that may be relevant to each located target transmitter, a promotion coupon for any store at each located target transmitter, a video relevant to an area near each located access point, a photo relevant to the area near each located target transmitter, any comments received on the area near each located target transmitter; a price list for products or services available near each located target transmitter; room availability near each located target transmitter; direction and distance information for any such user equipment in the plurality of user equipment to approach the target transmitter, and floor numbers of buildings near each located target transmitter.

5. The non-transitory computer readable medium of claim 3, storing instructions thereon, the instructions further enable the computer to implement steps of:

using an Internet connection between said computer and one or more remote servers to upload material of a target transmitter in the plurality of target transmitters to said one or more remote servers; and manage the proximity information of each verified target transmitter to the said one or more remote servers, wherein said material can be used to verify ownership of a target transmitter in the plurality of target transmitters that once verified becomes a verified target transmitter.

\* \* \* \* \*